United States Patent
Dai et al.

(10) Patent No.: US 11,282,207 B2
(45) Date of Patent: Mar. 22, 2022

(54) IMAGE PROCESSING METHOD AND APPARATUS, AND STORAGE MEDIUM

(71) Applicant: TENCENT TECHNOLOGY (SHENZHEN) COMPANY LIMITED, Guangdong (CN)

(72) Inventors: Yurong Dai, Shenzhen (CN); Qi Fan, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 50 days.

(21) Appl. No.: 16/902,798

(22) Filed: Jun. 16, 2020

(65) Prior Publication Data
US 2020/0311943 A1  Oct. 1, 2020

Related U.S. Application Data

(63) Continuation of application No. PCT/CN2019/076127, filed on Feb. 26, 2019.

(30) Foreign Application Priority Data

Mar. 1, 2018  (CN) .................. 201810172602.3

(51) Int. Cl.
*G06T 7/00* (2017.01)
*G06T 7/11* (2017.01)
(Continued)

(52) U.S. Cl.
CPC ............. *G06T 7/11* (2017.01); *G06K 9/033* (2013.01); *G06K 9/6232* (2013.01);
(Continued)

(58) Field of Classification Search
CPC ............. G06T 7/11; G06T 2207/20081; G06T 2207/20084; G06T 2207/20104;
(Continued)

(56) References Cited

U.S. PATENT DOCUMENTS

2008/0144943 A1* 6/2008 Gokturk .............. G06T 7/0002
382/224
2016/0110632 A1 4/2016 Kiraly et al.
(Continued)

FOREIGN PATENT DOCUMENTS

CN 101819679 A 9/2010
CN 102572450 A 7/2012
(Continued)

OTHER PUBLICATIONS

International Search Report of PCT/CN2019/076127 dated May 30, 2019 [PCT/ISA/210].
Written Opinion of PCT/CN2019/076127 dated May 30, 2019 [PCT/ISA/237].
Extended European Search Report dated Oct. 28, 2021 from the European Patent Office in European Application No. 19759953.3.

*Primary Examiner* — Ping Y Hsieh
(74) *Attorney, Agent, or Firm* — Sughrue Mion, PLLC

(57) ABSTRACT

An image processing method performed by a computing device deployed with a deep-learning neural network is provided. An image, including an object to be segmented from the image, is acquired. The object is segmented from the image by using the deep-learning neural network to acquire a first segmentation result. Correction information input by a user with respect to the first segmentation result is acquired. Based on correction information, the first segmentation result is modified by using the deep-learning neural network, to acquire a second segmentation result.

15 Claims, 12 Drawing Sheets

(51) Int. Cl.
*G06K 9/03* (2006.01)
*G06K 9/62* (2022.01)
*G06N 3/04* (2006.01)
*G06N 3/08* (2006.01)

(52) U.S. Cl.
CPC ......... *G06K 9/6253* (2013.01); *G06K 9/6256* (2013.01); *G06N 3/04* (2013.01); *G06N 3/08* (2013.01); *G06T 2207/20081* (2013.01); *G06T 2207/20084* (2013.01); *G06T 2207/20104* (2013.01); *G06T 2207/20132* (2013.01)

(58) Field of Classification Search
CPC .......... G06T 2207/20132; G06K 9/033; G06K 9/6232; G06K 9/6253; G06K 9/6256; G06K 9/342; G06K 9/627; G06N 3/04; G06N 3/08; G06N 3/0454; G06N 3/084
See application file for complete search history.

(56) References Cited

U.S. PATENT DOCUMENTS

| | | | | |
|---|---|---|---|---|
| 2018/0078313 | A1* | 3/2018 | Comaniciu | A61B 5/055 |
| 2018/0108137 | A1* | 4/2018 | Price | G06T 7/11 |
| 2019/0163949 | A1* | 5/2019 | Park | G06N 3/08 |
| 2020/0020102 | A1* | 1/2020 | Dai | G06K 9/6267 |
| 2020/0218961 | A1* | 7/2020 | Kanazawa | G06T 5/002 |

FOREIGN PATENT DOCUMENTS

| | | | |
|---|---|---|---|
| CN | 106886801 A | 6/2017 | |
| CN | 108345890 A | 7/2018 | |

\* cited by examiner (a) Acquire an image  (b) Acquire a segmentation result  (c) Optimize the segmentation result (a) Acquire an image  (b) Acquire a cropping result  (c) Optimize the cropping result  (d) Crop an object

IMAGE PROCESSING METHOD AND APPARATUS, AND STORAGE MEDIUM

CROSS-REFERENCE TO RELATED APPLICATION(S)

This application is a bypass continuation application of International Application No. PCT/CN2019/076127, filed on Feb. 26, 2019, which claims priority to Chinese Patent Application No. 201810172602.3, entitled "IMAGE PROCESSING METHOD AND APPARATUS, AND RELATED DEVICE", and filed with the National Intellectual Property Administration, of the People's Republic of China (PRC) on Mar. 1, 2018, which is incorporated herein by reference in its entirety.

FIELD

Example embodiments of the disclosure relate to the field of image recognition, and in particular, to an image processing method, an image processing apparatus, a storage medium, and a related device.

BACKGROUND

With the growing demand for image processing, image segmentation technologies are increasingly and extensively applied. In processing an image, it is highly desired that an object of interest is accurately segmented or cropped from the image. An image processing method by using conventional technologies requires a plurality of operations on the image, resulting in complex operations and a bad effect. A deep-learning neural network, as a new tool for image processing, has been developed rapidly in recent years. However, image processing performed by using a traditional deep-learning neural network results in complex operations, high costs, a high bit error rate, a slow transmission speed, and poor security, causing unfriendly user experience. For example, a segmentation result or cropping result of the deep-learning neural network is not accurate enough, and a fixed object type may be only segmented or cropped, greatly limiting an application of the deep-learning neural network to a real user scenario. In addition, although a relatively accurate segmentation result or cropping result may be obtained through a deep-learning neural network under user supervision, a calculation burden on the neural network is greatly increased.

SUMMARY

One or more example embodiments of the disclosure provide an image processing method and an image processing apparatus, a storage medium, and a corresponding electronic device for image processing, to overcome shortcomings of problems in the related art, such as a bad segment result or cropping result, or great increase of a calculation burden on a neural network, and achieve effects that a relatively accurate segmentation result or cropping result is obtained under user supervision, during image processing such as image segmentation or image cropping by using a traditional deep-learning neural network.

According to an aspect of an example embodiment, provided is an image processing method performed by a computing device deployed with a deep-learning neural network is provided. An image, including an object to be segmented from the image, is acquired. The object is segmented from the image by using the deep-learning neural network to acquire a first segmentation result. Correction information input by a user with respect to the first segmentation result is acquired. Based on correction information, the first segmentation result is modified by using the deep-learning neural network, to acquire a second segmentation result.

According to an aspect of an example embodiment, a method for training a deep-learning neural network is provided. The method includes:
acquiring a training data set, and converting all object types in the training data set into a foreground type to generate a new training data set; and
training the deep-learning neural network by using the new training data set.

According to an aspect of an example embodiment, an image processing method is provided. The method includes:
acquiring an image and a selection region of the image, the selection region including an object to be segmented from the image;
segmenting the object from the image by using a deep-learning neural network generated by using the foregoing method for training the deep-learning neural network, to acquire a first segmentation result;
acquiring correction information input by a user with respect to the first segmentation result; and
modifying, based on the correction information, the first segmentation result by using a partial layer close to an output layer in the deep-learning neural network to acquire a second segmentation result.

According to an aspect of an example embodiment, an image processing apparatus is provided. The apparatus includes: at least one memory configured to store program code; and at least one processor configured to read the program code and operate as instructed by the program code, the program code including:
acquiring code configured to cause at least one of the at least one processor to acquire an image, the image including an object to be segmented from the image;
interaction code configured to cause at least one of the at least one processor to acquire correction information input by a user with respect to a first segmentation result; and
processing code configured to cause at least one of the at least one processor to segment the object from the image by using a deep-learning neural network to acquire the first segmentation result, and modify, based on the correction information, the first segmentation result by using the deep-learning neural network to acquire a second segmentation result.

According to an aspect of an example embodiment, an image processing method is provided. The image processing method is performed by a computing device deployed with a deep-learning neural network. The image processing method includes:
acquiring an image and a cropping region of the image, the cropping region including an object to be cropped from the image;
cropping the object from the image by using the deep-learning neural network to acquire a first cropping result;
acquiring correction information input by a user with respect to the first cropping result;
modifying, based on the correction information, the first cropping result by using the deep-learning neural network to acquire a second cropping result; and
acquiring the object in the second cropping result.

According to an aspect of an example embodiment, an image processing apparatus is provided. The apparatus includes: at least one memory configured to store program code; and at least one processor configured to read the program code and operate as instructed by the program code, the program code including:

acquiring code configured to cause at least one of the at least one processor to acquire an image and a selection region of the image, the selection region including an object to be cropped from the image;

interaction code configured to cause at least one of the at least one processor to acquire correction information input by a user with respect to a first cropping result; and processing code configured to cause at least one of the at least one processor to crop the object from the image by using a deep-learning neural network to acquire the first cropping result, and modify, based on the correction information, the first cropping result by using the deep-learning neural network to acquire a second cropping result.

According to an aspect of an example embodiment, a non-transitory computer-readable storage medium storing a computer program is provided, the computer program, when executed by at least one processor, causing the at least one processor to perform one or more of the foregoing image processing methods.

According to an aspect of an example embodiment, an electronic device is provided, including:

at least one processor; and a memory configured to store an instruction executable by the at least one processor to cause the at least one processor to perform one or more of the foregoing image processing methods.

In the image processing method and the image processing apparatus, the method for training the deep-learning neural network, the storage medium, and the corresponding electronic device and program product according to the example embodiments of the disclosure, the to-be-segmented object in the selection region of the image is segmented through the deep-learning neural network to acquire the first segmentation result, and then the first segmentation result is optimized based on the acquired correction information of the user with respect to the first segmentation result by using the deep-learning neural network, to acquire the more accurate second segmentation result. In the foregoing and following one or more example embodiments of the disclosure, the first segmentation result is optimized by using the correction information of the user with respect to the first segmentation result, so that an accurate segmentation result or cropping result is obtained through less user interactions, while reducing a calculation amount of the neural network, greatly reducing costs, and improving user experience.

BRIEF DESCRIPTION OF THE DRAWINGS

The above and other features and advantages of the disclosure will become more apparent from the detailed description of example embodiments of the disclosure with reference to the accompanying drawings.

DETAILED DESCRIPTION

Figures 1A, 1B:
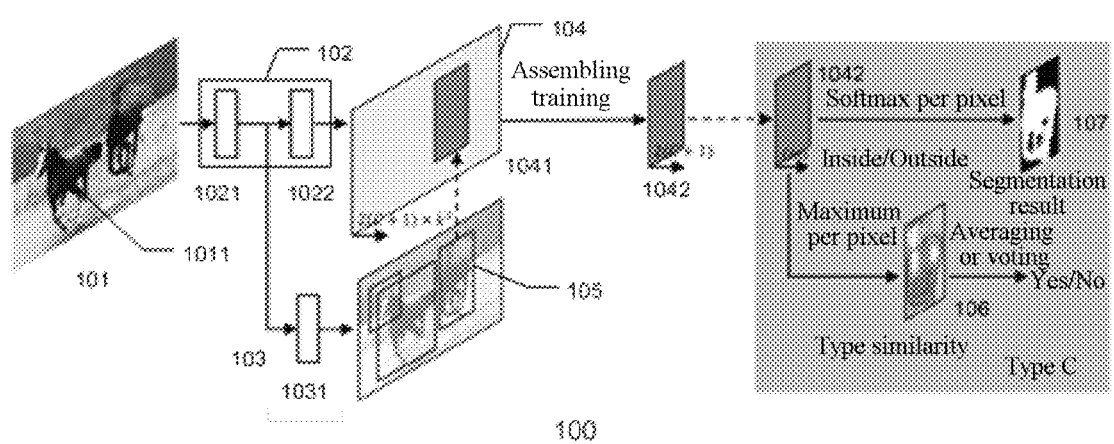
FIG. 1A is a schematic flowchart of image segmentation by a fully convolutional instance-aware semantic segmentation (FCIS) deep-learning neural network according to an example embodiment of the disclosure.
FIG. 1B is a schematic flowchart of image segmentation by a deep interactive object selection (DIOS) deep-learning neural network according to an example embodiment of the disclosure.

The example embodiments are described comprehensively with reference to the accompanying drawings. However, the example embodiments may be implemented in multiple forms, and it is not to be understood as being limited to the examples of implementations described herein. Conversely, the implementations are provided to make the disclosure more comprehensive and complete, and comprehensively convey the idea of the example embodiments to a person skilled in the art. In the figures, for clarity, the sizes of some components may be exaggerated or deformed. Same reference numerals in the accompanying drawings represent same or similar structures, and therefore detailed descriptions of the components or units are omitted.

As used herein, the term "and/or" includes any and all combinations of one or more of the associated listed items. Expressions such as "at least one of," when preceding a list of elements, modify the entire list of elements and do not modify the individual elements of the list. For example, the expression "at least one of a, b, and c," should be understood as including only a, only b, only c, both a and b, both a and c, both b and c, or all of a, b, and c.

The terms "first", "second", and the like may be used to describe various configuration elements, but configuration elements should not be limited by the terms. The terms are only used to distinguish one configuration element from another configuration element.

A singular expression includes multiple expressions unless the context clearly indicates otherwise. In addition, when a part is described to "include" a certain configuration element, which means that the part may further include other configuration elements, except to exclude other configuration elements unless otherwise stated.

In addition, a term " . . . unit", " . . . module", or the like described in the specification means a unit for processing at least one function or operation, which may be implemented by hardware or software, or a combination of the hardware and the software.

In addition, the described features, structures, or characteristics may be combined in one or more embodiments in any appropriate manner. In the following descriptions, specific details are provided to give a comprehensive understanding of the example embodiments of the disclosure. However, a person skilled in the art may be aware that, the technical solutions in the disclosure may be implemented without one or more of the particular details, or another method or component may be used. In other cases, known structures, methods, or operations are not shown or described in detail to avoid obscuring aspects of the disclosure.

Related technical terms are introduced before a technical solution of the disclosure is described.

Neural Network:
a mathematical model that simulates neuron fitting data for classification and recognition. The neural network may have a plurality of layers, for example, from a data input-output direction, the neural network may include an input layer, an intermediate hidden layer, and a final output layer. Each layer includes nodes representing the neuron. An excitation function of the neuron is used for performing an operation on an input of each node to obtain an output value as an activation value and send the output value to a node of a next layer. Before the neural network is used, training data (set) is required to be used for training parameters of the nodes in each layer of the neural network.

Fully Convolutional Network (FCN):
a convolutional network commonly used in image processing, especially image segmentation, and including a convolutional layer (CONV) and a pooling layer. In the fully convolutional network, a lower convolutional layer (or shallower convolutional layer, a convolutional layer closer to an input side) has a smaller perception domain and may learn a feature of a local region. A higher convolutional layer (or a deeper convolutional layer, a convolutional layer closer to an output side) has a larger perception domain and may learn a more abstract feature. Such abstract features are less sensitive to a size, a position, and an orientation, etc. of an object, thereby helping to improve recognition performance. A traditional convolutional neural network (CNN) includes a convolutional layer, a pooling layer, and a fully-connected layer, but the fully-convolutional network (FCN) has no fully-connected layer.

The pooling layer performs upsampling on an output image of each layer through bilinear interpolation to obtain an image having a size the same as a size of an original image. Pooling may reduce data amount for deep learning to reduce a parameter and calculation amount, thereby preventing overfitting. Different number of pooling layers may be inserted at an interval in successive convolutional layers depending on a situation. In some embodiments of the disclosure, 4 pooling layers are added to the convolutional layer. Generally, for the pooling, mean-pooling and max-pooling are mainly used. A parameter involved in the pooling layer is a stride. For example, max-pooling is performed on a feature map with stride=2 and 100×100 pixel, that is, input maximal values of feature maps with 50×50 pixel in every 2×2 regions are taken as a result of the pooling.

Instance Segmentation:
segmenting each object in an image separately and giving category information of each object.

Foreground Segmentation:
using each object in an image as a foreground category and segmenting each object separately.

Interactive Segmentation:
segmenting an object in an image through a human-computer interaction.

Feature Map:
a feature map obtained through a convolution operation on one or more filters in conventional layers of an image and FCN. The feature map is actually a score map corresponding to image position information. The feature map may be convolved with the filter of the convolutional layer again to generate a new feature map.

Position-Sensitive Feature Maps:
maps obtained through a convolution operation on an image or a feature map of the image by using a set of dedicated convolutional layers (a filter of the convolutional layers being sensitive to a position). The position-sensitive feature map is a score map that encodes position information corresponding to a relative spatial position (for example, "on the left of an object").

Residual Network (ResNet):
a type of a fully convolutional network, a fully-connected layer being unused at an end of the network. ResNet itself may be used for a classification task. In some embodiments of the disclosure, ResNet may be first trained by using an ImageNet training set for the classification task, and then some functions of ResNet are selected for an image segmentation task.

A deep-learning neural network that may be used for image processing, e.g., image segmentation, includes a fully convolutional instance-aware semantic segmentation (FCIS) network and a deep interactive object selection (DIOS) network. The FCIS network and DIOS network generally use convolutional networks or fully convolutional networks as basic networks of the deep-learning neural network.

FCIS uses a position-sensitive feature map to encode spatial position information, so as to predict a probability that a pixel belongs to an object instance at a relative position and a probability that the pixel is inside or outside an object boundary, and an instance segmentation result of the object is hereby generated.

FIG. 1A shows an example process of image segmentation by using an FCIS network.

After an image 101 is processed by a part of a convolutional layer 1021 of an FCN 102, an output image feature map (score map) is processed through the other part of convolutional layer 1022 of the FCN in an upper branch, and the image feature map is also processed through a region proposal network (RPN) 103 in a lower branch. A number of rectangular frames 105 extracted by the RPN 103 from an acquired image feature map 104 for image segmentation is $2(C+1)Xk^2$. C is a natural number, representing a number of types of objects; 1 represents a background type, then (C+1) is a number of all types of objects 1011 defined in the RPN 103, and 2(C+1) represents a total number of object types inside or outside the boundary of the object 1011; and k represents a number of positions of the rectangular frame 105, and k is a natural number. For example, when k=3, 3×3 represents that the feature map 104 output by an upper branch is superimposed with a rectangular frame of 9 blocks. Each block of the rectangular frame 105 has a feature map, the feature map corresponding to a filter in a convolutional layer 1031.

Assembling training is performed on the feature map 1041 after the image feature map 104 (position-sensitive internal/external score map) of the final result output by the FCN 102 and the rectangular frame 105 output by the RPN 103 is superimposed, to obtain an output image feature map 1042 of 2(C+1) types of objects 1011 in the rectangular frame 105. In a case that the object 1011 is inside or outside the rectangular frame 105, a pixel-wise function is run in a lower branch according to a situation of the object 1011 in the inside or outside of an object boundary represented by the rectangular frame 105, and a type similarity result 106 is obtained by using the rectangular frame 105 to select a to-be-segmented object 1011. An averaging and/or voting operation is performed on the type similarity result 106, to determine whether an object 1011 selected in the output image 101 belongs to a corresponding classification result (yes/no) set in the RPN 103. If the determination result is 'yes', it represents that the object 1011 selected in the rectangular frame 105 exists in a corresponding type. Therefore, a pixel-wise softmax function is run on an output result 1042 (that is, an image feature map) in an upper branch according to the situation of the object 1011 in the inside or outside of the object boundary represented by the rectangular frame 105, and an instance segmentation result 107 is obtained. If the determination result is 'no', it proves that the object selected in the rectangular frame 105 fails to correspond to a corresponding type, and then the segmentation result 107 is not processed. FIG. 1A only shows segmentation of a $C^{th}$ type of the object 1011. In an actual operation, segmentation of other (C−1) types of objects 1011 is further included.

Therefore, an FCIS network 100 segments the object 1011 by generating the rectangular frame 105 based on classification, and then generates an instance segmentation result 107 of the object 1011. The FCIS network 100 generates the instance segmentation result 107 of the object 1011 in an end-to-end manner. Such manner has two disadvantages below:

1) there is no result optimization, and if the rectangular frame 105 is inaccurately generated or the segmentation result is bad, the result cannot be corrected and modified; and 2) because a number of output layers of the FCIS network 100 is the same as a number of types of a training data set, a fixed object type (such as a type C) may be only segmented. In a case that the object 1011 belongs to an object type not in the training set, the FCIS network 100 cannot segment the object 1011 in the image 101 because the FCIS network 100 needs to perform classification first, and then performs image segmentation upon classification success.

The two disadvantages greatly limit an application of the FCIS network.

FIG. 1B shows a process of image segmentation by using a DIOS network.

As shown in FIG. 1B, a DIOS network 200 superimposes an input image 201 on one or more distance distribution maps 2021 and 2022 generated by user tapping. The images obtained through superimposing are input into an FCN 203. The FCN 203 processes a composite image including information about the input image 201 and the distance distribution maps 2021 and 2022 to obtain a final segmentation result 204.

The DIOS network 200 acquires tapping information input by the user completely in a user interaction manner such as tapping to generate the segmentation result 204. Because the DIOS network 200 does not use a rectangular frame to calibrate a region of interest, a great number of user interactions is needed to generate the satisfactory segmentation result 204. In addition, in a case that the segmentation result 204 is generated, the entire FCN 203 needs to be recalculated for each user tapping, greatly increasing a calculation burden.

According to an example embodiment, a solution by using an improved deep-learning neural network for image processing, e.g., for image segmentation, is provided.

Figure 2A:
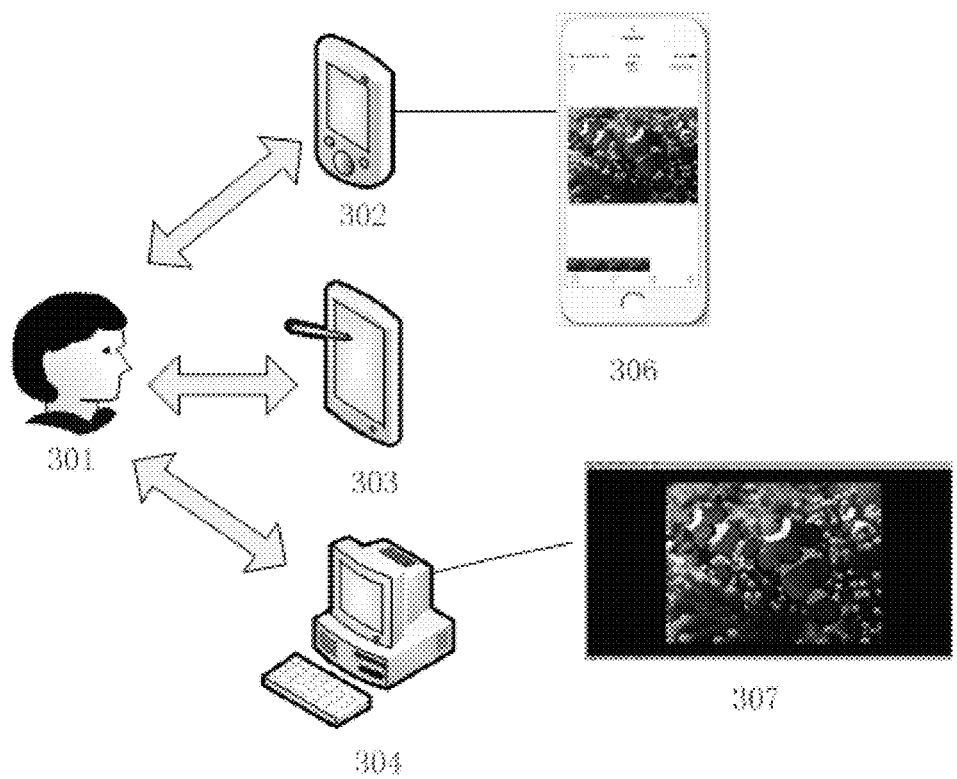
FIG. 2A is a schematic diagram of an image processing method and a system architecture of an image processing apparatus according to an example embodiment of the disclosure.

FIG. 2A shows a schematic diagram of an image processing method and a system architecture of an image processing apparatus according to an example embodiment. A user 301 performs image processing through an application program on a mobile device including, for example, a mobile phone 302 and a personal digital assistant (PDA) 303, or through an application program on a device such as a computer 304. Different image processing interfaces may be used on different devices, for example, an interface 306 may be used on the mobile device, and an interface 307 may be used on a computer 304. The user 301 inputs an image through input devices of the mobile devices 302, 303 and the computer 304 and inputs correction information for the image segmentation or cropping result via a user interaction. The mobile devices 302, 303 and the computer 304 segment or crop an object in the image by using the image processing method of the disclosure.

Figure 2B:
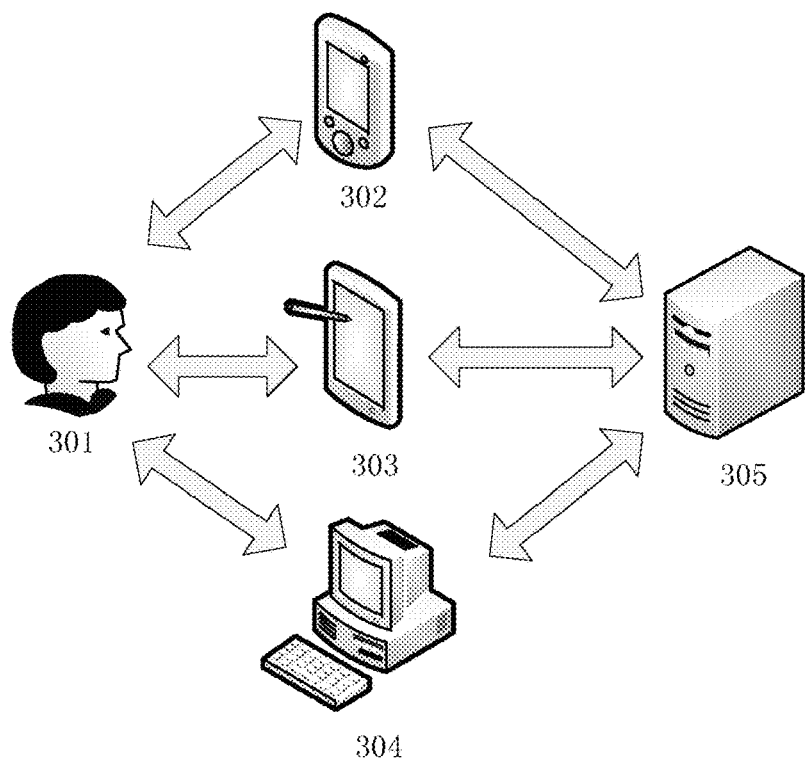
FIG. 2B is a schematic diagram of an image processing method and a system architecture of an image processing apparatus according to another example embodiment of the disclosure.

FIG. 2B shows a schematic diagram of an image processing method and a system architecture of an image processing apparatus according to another example embodiment. Different from FIG. 2A, mobile devices 302 and 303, and a computer 304 serve as terminal devices or front-end devices, and an image input by a user 301 and correction information input by the user 301 for image segmentation or cropping in a user interaction are sent to a remote or a rear-end server 305. The server 305 runs an image processing program to implement the image processing method of the disclosure, and returns an image segmentation or cropping result to the terminal devices or front-end devices 302, 303, and 304. An interface similar to an interface in FIG. 2A may be used for the mobile devices 302, 303 and the computer 304 in FIG. 2B.

Therefore, a computing device that is used as an execution subject of the image processing method according to the example embodiment of the disclosure or an image processing apparatus according to the example embodiment of the disclosure may be a terminal device such as the mobile devices 302 and 303, and the computer 304, or may be a server device such as the server 305, or any other computing device that may implement the image processing method according to the example embodiment of the disclosure.

Figure 3A:
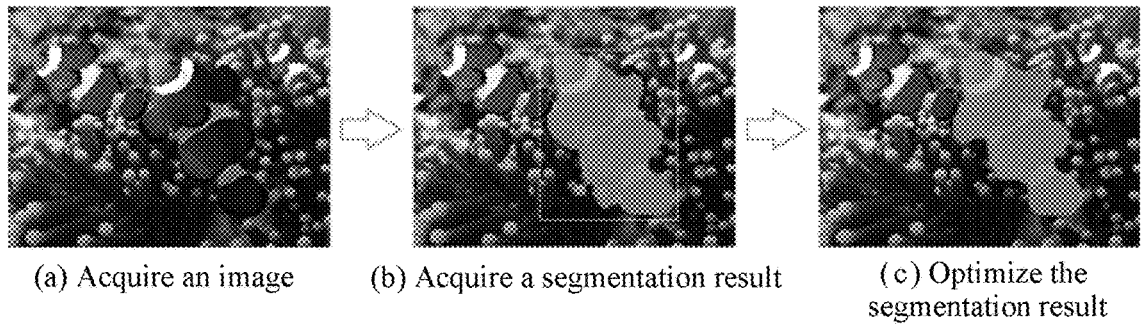
FIG. 3A is a schematic basic flowchart of an image processing solution according to an example embodiment of the disclosure.

FIG. 3A shows a schematic basic flowchart of the foregoing image processing solution according to an example embodiment. First, (a) an image is acquired, (b) a deep-learning neural network segments, according to a rectangular frame (shown in a middle view of (b) of FIG. 3A) given by a user for calibrating an object of interest, a target object in the rectangular frame through an algorithm to obtain a segmentation result; (c), the segment result may be modified through fewer user interactions to achieve rapid optimization.

Figure 3B:
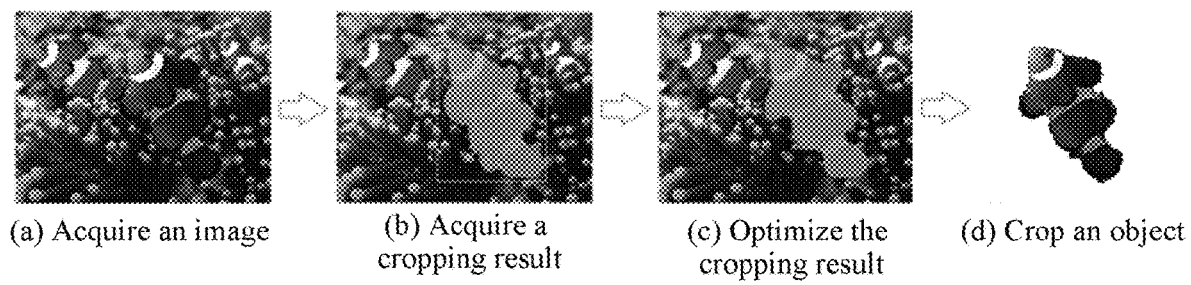
FIG. 3B is a schematic basic flowchart of an image processing solution according to another example embodiment of the disclosure.

FIG. 3B shows a schematic basic flowchart of an image processing solution according to another example embodiment. In an actual application scenario of image processing, there is a need for a user to crop an object of interest from an image, that is, a "cropping" function of image processing software. For example, the user intends to crop a portrait in a photo from the photo, and superimpose the cropped portrait on other photos or images. In such image processing solution, compared with the solution shown in FIG. 3A, first, (a) an image is acquired, then (b) a deep-learning neural network crops, according to a rectangular frame given by the user for calibrating an object of interest, a target object in the rectangular frame through an algorithm to obtain a cropping result, and (c) the cropping result may be modified through fewer user interactions to achieve rapid optimization, and after (c) the cropping result is optimized, (d) the object is cropped from the optimized cropping result. During cropping of the object from the image, a corresponding cropping result (segmentation result) is acquired in a same or similar manner as a manner for the object to be segmented. For the finally optimized cropping result (segmentation result), in a cropping process according to this embodiment, the object in the cropping result is also cropped for a further operation.

Figure 4:
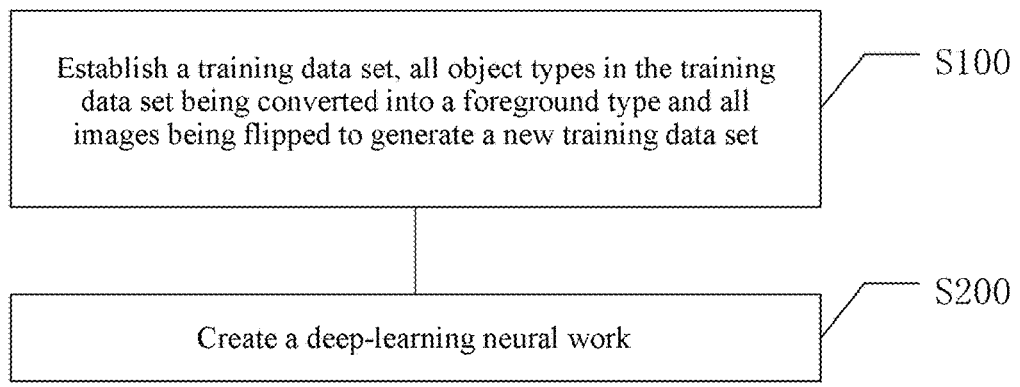
FIG. 4 is a schematic flowchart of a method for generating a deep-learning neural network according to an example embodiment of the disclosure.

In order to perform image processing by using an improved deep-learning neural network, the deep-learning neural network is first generated. FIG. 4 shows a method for generating a deep-learning neural network according to an example embodiment. The method includes the following operations:

S100: Establish a training data set, all object types in the training data set being converted into a foreground type and all images being flipped to generate a new training data set; and S200: Create a deep-learning neural work.

In order to generate the deep-learning neural network, it is important to build a deep-learning neural network model based on interactive object segmentation.

In a case that the training data set is established (operation S100), publicly available PASCAL VOC2012 and MSCOCO instance segmentation data sets are used as the training data sets. In the instance segmentation data, top 5000 image instances may be used for training image recognition capability of a model, and last 3000 image instances may be used for training the user interaction correction capability of the model, so that the deep-learning neural network according to the example embodiment of the disclosure may accurately process an object type in a rectangular frame of an object of interest calibrated by the user and correction data for user interaction.

Afterwards, all instance types in the training data set are converted into a foreground type. That the multiple object types are converted into a single foreground type is that, during training and use of the deep-learning neural network, a corresponding rectangular frame of a type is no longer determined and generated for a type in the training data, but rectangular frames are generated for all object types. In a manner that the multiple types are converted into a single type, an operation of classification of objects in an image is skipped. During training and use of a network model, an object in a rectangular frame of interest calibrated by the user is segmented directly. Image segmentation is performed by fully using processing capability of the deep-learning neural network. In addition to type conversion, all images in the training data set are flipped horizontally to generate a corresponding flipped image and label. In this case, the training data set is expanded to be twice bigger than the original training data set and is used as a new training data set.

Figure 5:
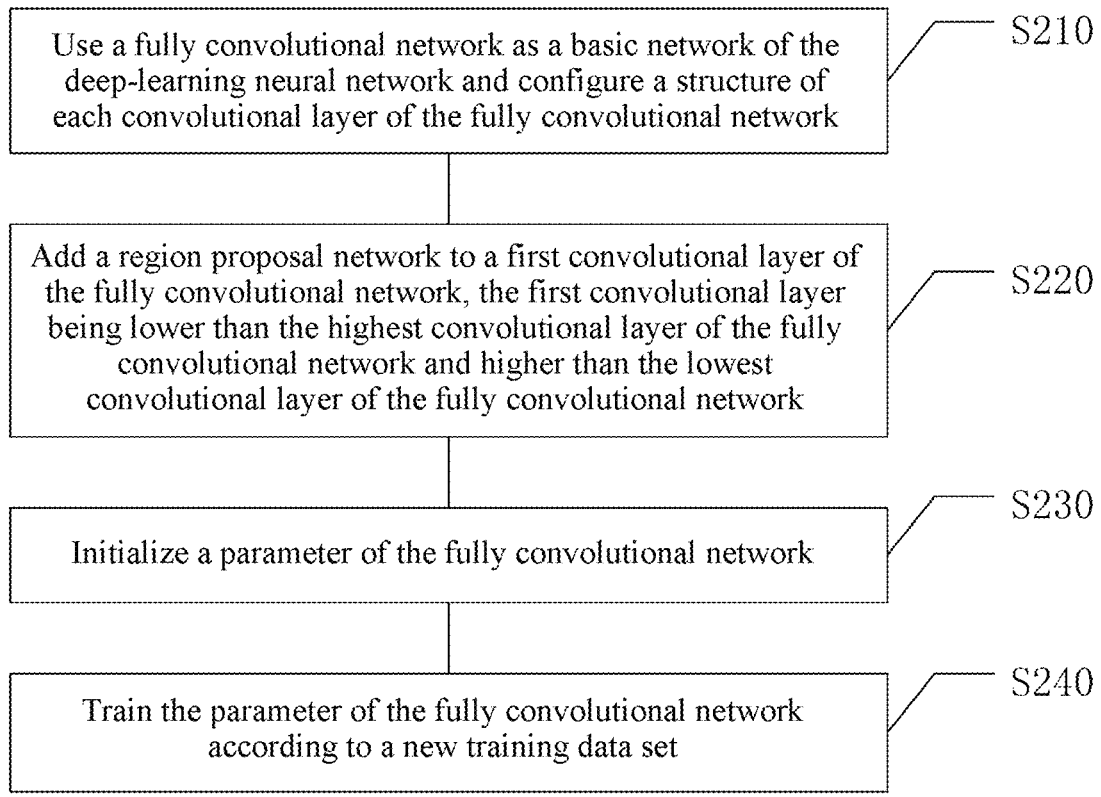
FIG. 5 is a schematic flowchart of operations for creating a deep-learning neural network according to an example embodiment of the disclosure.

The creating a deep-learning neural network in operation S200 further includes the following operations shown in FIG. 5:

S210: Use a fully convolutional network as a basic network and configure a structure of each convolutional layer of the fully convolutional network;

S220: Add a region proposal network to a first convolutional layer of the fully convolutional network, the first convolutional layer being lower than a highest convolutional layer of the fully convolutional network and higher than a lowest convolutional layer of the fully convolutional network;

S230: Initialize a parameter of the fully convolutional network; and

S240: Train the parameter of the fully convolutional network according to a new training data set.

In operation S210, the basic network is designed first.

In some embodiments of the disclosure, an FCN ResNet101 is used as a basic network model, parameters of the network structure being shown in Table 1.

TABLE 1

| Name of a convolutional layer | Output size (pixel) | ResNet-101 | |
|---|---|---|---|
| Conv1 | 300 × 500 | 7 × 7, 64, stride2 | |
| Conv2_x | 150 × 250 | 3 × 3 maxpool, stride2 | |
| | | 1 × 1, 64 | ×3 blocks |
| | | 3 × 3, 64 | |
| | | 1 × 1, 256 | |
| Conv3_x | 76 × 126 | 1 × 1, 128 | ×4 blocks |
| | | 3 × 3, 128 | |
| | | 1 × 1, 512 | |
| Conv4_x | 38 × 63 | 1 × 1, 256 | ×23 blocks |
| | | 3 × 3, 256 | |
| | | 1 × 1, 1024 | |
| Conv5_x | 38 × 63 | 1 × 1, 512 | ×3 blocks |
| | | 3 × 3, 512 | |
| | | 1 × 1, 2048 | |
| Conv_new | 38 × 63 | 1 × 1, 1024 | |

The basic network, FCN, used in the disclosure includes six convolutional layers of Conv1 to Conv_new. From Conv1 to Conv_new, a level of the convolutional layer gradually increases. Conv1 is a lowest convolutional layer, and Conv_new, as the last layer, is a highest convolutional layer. In some embodiments, the convolutional layers are all fully-connected layers. The fully convolutional network, as a kind of a neural network, has a lowest convolutional layer equivalent to an input layer, a highest convolutional layer equivalent to an output layer, and an intermediate convolutional layer equivalent to a hidden layer.

Convolutional layers Conv_new Conv1 and Conv_new are single convolutional layers. The convolutional layers of Conv2_x, Conv3_x, Conv4_x, and Conv5_x represent that the convolutional layers include a plurality of modules (blocks, or convolutional sublayers), respectively, x being a number of the modules in the convolutional layers, respectively. For example, the convolutional layer Conv2 has 3 modules (×3blocks), which are Conv2_1, Conv2_2, and Conv2_3 respectively. Numbers of modules in the convolutional layers Conv3, Conv4, and Conv5 are 4, 23, and 3, respectively. In other words, the convolutional layers with a plurality of modules may be also regarded as a combination of the plurality of convolutional layers. Each module (convolutional sublayer) is also actually a convolutional layer. An output result of each convolutional layer is a feature map of a processed image, a size of the feature map gradually decreasing from 300 (pixels)×500 (pixels) to 38 (pixels)×63 (pixels).

Different numbers of filters with different sizes are used for each single convolutional layer and each module in a multi-module convolutional layer. For example, in the convolutional layer Conv1, a size of a filter is 7 (pixels)×7 (pixels), there are 64 filters in total, and a stride is 2. A multi-module convolutional layer Conv4_x in Table 1 has 23 modules in total. Each module has 256 filters with 1 (pixel)×1 (pixel), 256 filters with 3 (pixel)×3 (pixel), and 1024 filters with 1 (pixel)×1 (pixel). A parameter of a pooling layer between the convolutional layer Conv1 and a convolutional layer module Conv2_1 is: stride=2. Max pooling is performed on an output image feature map with 3 (pixels)×3 (pixels).

First modules (first convolutional sublayers) of convolutional layers Conv3_x and Conv4_x each has a stride of 2. Each convolutional layer is followed by an activation function (ReLU) layer and a batch normalization (BN) layer.

Figure 6:
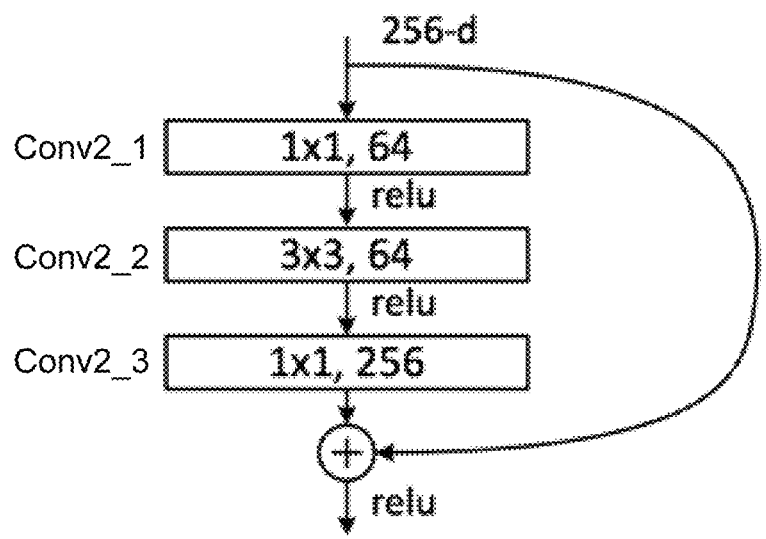
FIG. 6 is a schematic diagram of a module structure in a convolutional layer of a deep-learning neural network according to an example embodiment of the disclosure.

A structure of each module of the convolutional layer is shown in FIG. 6, three modules of the convolutional layer Conv2 being used as an example. A 256-dimensional (256-d) feature data output from the convolutional layer Conv1 is processed by 64 filters with 1×1 of a module Conv2_1 respectively, is processed by a rectified linear unit of an activation function layer ReLU, is processed by 64 filters with 3×3 of a module Conv2_2, is processed by the rectified linear unit of the activation function layer ReLU, and is then processed by 256 filters with 1×1 of a module Conv2_3, to obtain a processing result. After the obtained processing result is combined with the input 256-dimensional feature map, the combined result is finally processed by the rectified linear unit of the activation function layer ReLU to generate an output result of the convolutional layer Conv2. Combination of the input 256-dimensional feature map with the processing result of the 256 filters of the third module Conv2_3 is intended to calculate a residual. An operation of the activation function ReLU may be the following: when x<=0, Y=0; When x>0, y=x, y being an output, and x being an input.

Next, in operation S220, design of a high-level neural network is performed.

In the deep-learning neural network according to an example embodiment, a branch is added to a last layer, for example, the module Conv4_23, of a convolutional layer Conv4 of the basic network FCN, to generate a rectangular frame for training by using a region proposal network RPN. A processing result (that is, the image feature map of the convolutional layer) output by the module Conv4_23 is projected, through a rectangular frame generated by the convolutional layer of the RPN, onto a position-sensitive feature map output by a highest convolutional layer Conv_new of the FCN. Finally, a segmentation result of the object in the rectangular frame is generated. A branch of the RPN is generally added to an intermediate convolutional layer that is higher than a lowest convolutional layer and lower than a highest convolutional layer. An advantage of selection of the intermediate convolutional layer is that the position-sensitive feature map of the image is acquired by fully using training and computing capability of the FCN, and not all convolutional layers are necessarily adjusted during training in a reverse recursive calculation of a parameter of a neural network, so that efficiency is improved. A convolutional layer or a module of the convolutional layer that adds the branch of the RPN is called a first convolutional layer. The first convolutional layer is lower than a highest convolutional layer of the FCN and is higher than a lowest convolutional layer of the FCN. A position of the first convolutional layer is generally determined according to actual demands. For example, in an example embodiment of the disclosure, the module Conv4_23 is used as the first convolutional layer.

Figure 7:
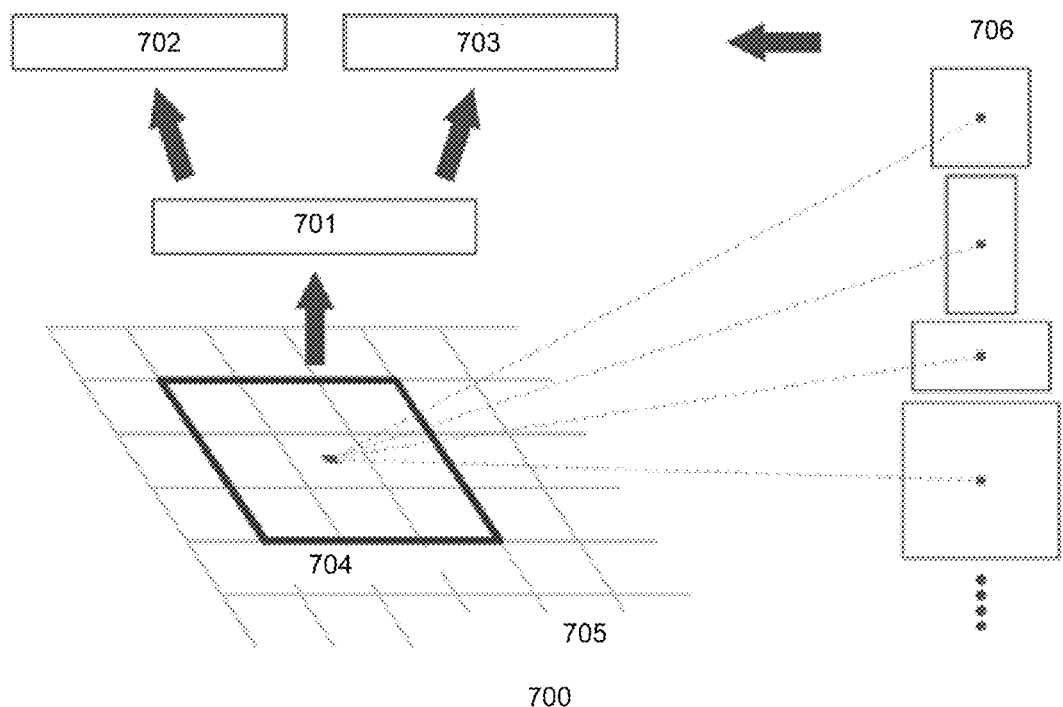
FIG. 7 is a schematic structural diagram of a region proposal network (RPN) according to an example embodiment of the disclosure.

FIG. 7 shows a structure of an RPN 700 according to an example embodiment. The RPN 700 includes an intermediate layer 701 with 256-dimensional data, a classification layer (clslayer) 702 that outputs $2k$ scores, and a regression layer (reglayer) 703 that outputs $4k$ coordinates, K being a number of object types. Different from the FCIS network, a training data set of the deep-learning neural network of the disclosure converts the type of an instance image into a foreground type. Therefore, the number k of object types herein is far more than a type that the RPN 700 may recognize in the FCIS network.

For a convolutional feature map 705 obtained after a convolutional layer of an FCN performs a convolutional operation on an image, the RPN 700 selects a sliding window 704 corresponding to k types of anchor boxes 706 (rectangular frames corresponding to the type) to slide on the convolutional feature map 705. Data of the feature map in the selected sliding window 704 is input in the RPN 700 for processing.

Through operation S210 and operation S220, architecture of the deep-learning neural network model is created. Now, parameters of the neural network are initialized in operation S230.

In one embodiment, convolutional layers Conv1 to Conv5 of the FCN are initialized with the parameters of ResNet101 pre-trained in the ImageNet dataset, and parameters of a highest convolutional layer Conv_new are initialized by using Gaussian distribution with a variance of 0.01 and a mean of 0. The ImageNet dataset may be only classified originally, but is used for an image segmentation task in the disclosure.

After the parameter is initialized, in operation S240, a new training data set established in operation S200 is used for training the deep-learning neural network. During training, a gradient descent method based on stochastic gradient descent (SGD) is used for resolving a convolutional template parameter w and a bias parameter b of a neural network model. In each iteration, a prediction result error is calculated and propagated back to the FCN neural network model, a gradient is calculated again, and the parameter of the FCN neural network model is updated.

Because the new training data set includes an image instance for image recognition capability and an image instance for user interaction correction capability, during training of the FCN by using the image instance, not only assembling training is performed by superimposing a rectangular frame outputted from the RPN with a position-sensitive feature map outputted from a highest convolutional layer of the FCN, but also a feature map outputted from an intermediate convolutional layer is selected in convolutional layers of the FCN to be superimposed in parallel with the image instance (the image instance of the part may be in a form of a correction position map) used for user interaction correction, and a new position-sensitive feature map is outputted from a higher convolutional layer, and then assembling training is performed. In this case, the selected intermediate convolutional layer may be the same as or different from an intermediate convolutional layer added to a branch of the RPN, but the selected intermediate convolutional layer of the FCN during the correction still meets a requirement of being higher than a lowest convolutional layer and lower than a highest convolutional layer of the FCN. The correction is equivalent to training by using a partial layer close to an output layer in the neural network. In other words, the deep-learning neural network may be regarded as including a first part and a second part. The second part is closer to an output side than the first part. When training is performed by using the image instance for the image recognition capability, the first part and the second part of the deep-learning neural network are used. When training is performed by using the image instance for the user interaction correction capability, only the second part (that is, the partial layer close to the output layer in the neural network) of the deep-learning neural network is used.

Figure 8:
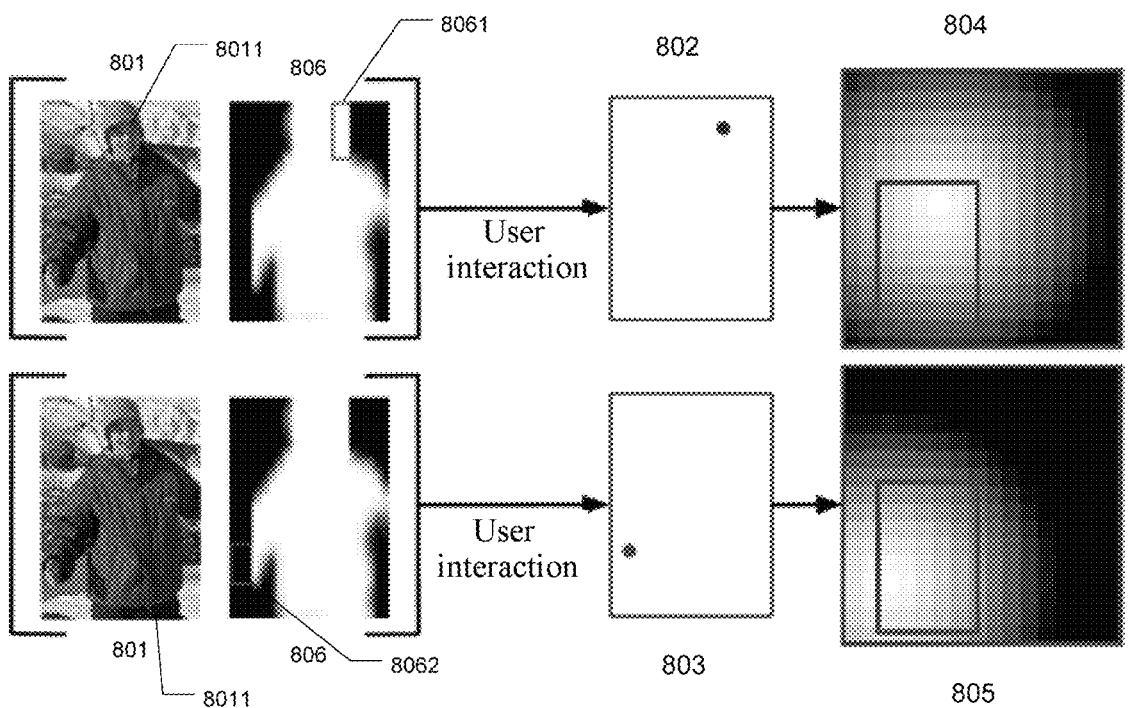
FIG. 8 is a schematic diagram of processing of correction information of a user interaction according to an example embodiment of the disclosure.

FIG. 8 shows details of generation of a correction map, e.g., a correction distance map, by using a segmentation result 806 obtained by segmenting an object 8011 in an image 801 through correction information of user interaction. An error in the correction information of the user for the segmentation result 806 may be obtained in a manner of user interaction such as acquiring user input. Correction information of the user for the segmentation result 806 may be acquired, and a correction map is generated according to the correction information as the image instance for the user interaction correction in the training data set. The user may input the correction information by tapping the segmentation result 806. For example, in one embodiment, the segmentation result 806 obtained by superimposing the output of the FCN and output of the RPN may be provided to the user, for example, by displaying on a screen, and the user may indicate an error in the segmentation result 806 by tapping. For example, if the segmented object 8011 has a partial image 8061 more than a desired object segmentation result, correction tapping by the user on the part may indicate that the partial image belongs to a background type. Such tapping is called background correction tapping 802. For example, if the segmented object 8011 has a partial image 8062 less than the desired object segmentation result, correction tapping by the user on the part may indicate that the partial image belongs to a foreground type. Such tapping is called foreground correction tapping 803. The foreground correction tapping 803 and the background correction tapping 802 are processed to generate a foreground correction (distance) map 805 and a background correction (distance) map 804, respectively. Both correction distance maps are superimposed with the feature map outputted from the second convolutional layer in the FCN to obtain, through training, an updated position-sensitive feature map from a higher convolutional layer.

When the deep-learning neural network is trained by using the image instance for the user interaction correction, parameters (for example, trained network parameters in the foregoing training manner) of the first part of the deep-learning neural network (such as Conv1-Conv4) are fixed, and only parameters of the second part of the deep-learning neural network (such as Conv5 and Conv_new) are adjustable.

Through the foregoing training, optimization of parameters of the deep-learning neural network is completed, and tasks of image recognition and segmentation may be performed.

In the foregoing embodiments described in combination with FIG. 4 to FIG. 8, a training process of the neural network including acquisition of the new training data set, construction of the deep-learning neural network, and training of the deep-learning neural network by using the new training data set to obtain the deep-learning neural network model is described.

Figure 9A:
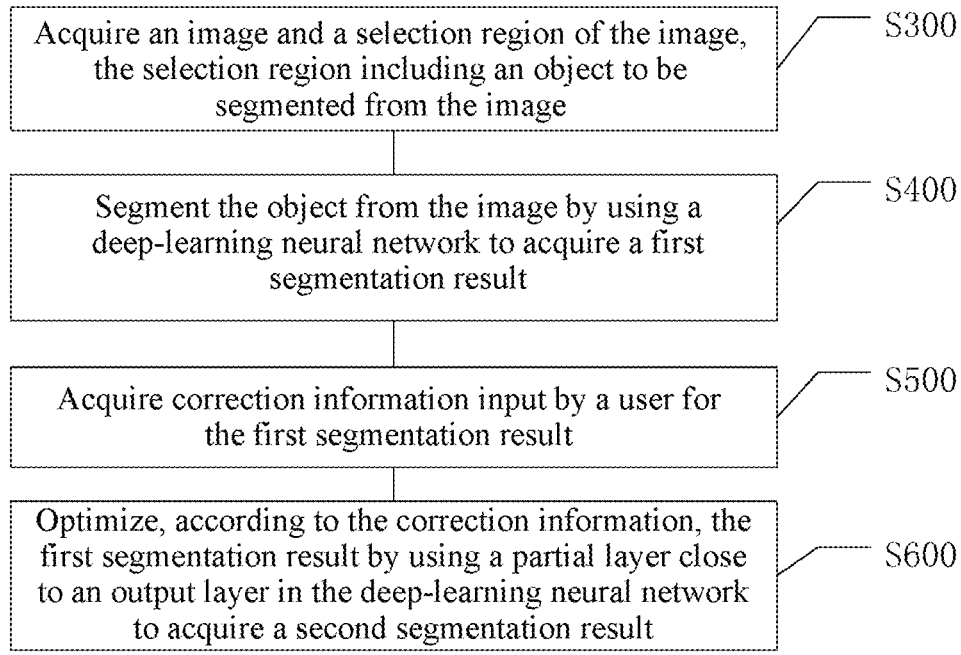
FIG. 9A is an example flowchart of an image processing method according to an example embodiment of the disclosure.

Now, a flow of image segmentation by using a deep-learning neural network is described with reference to an example image processing method in FIG. 9A. The method includes the following operations:

S300: Acquire an image and a selection region of the image, the selection region including an object to be segmented from the image;

S400: Segment the object from the image by using the deep-learning neural network to acquire a first segmentation result;

S500: Acquire correction information input by a user with respect to the first segmentation result; and S600: Modify, according to the correction information, the first segmentation result by using a partial layer close to an output layer in the deep-learning neural network to acquire a second segmentation result.

First, the image input by the user and a rectangular frame calibrated by the user on the image are received. The rectangular frame, as a selection region of interest to the user, includes the object to be segmented from the image. In addition, the rectangular frame for calibrating the object may also be automatically generated through image recognition. The user may perform adjustment and determination by selecting or dragging an automatically provided recommended rectangular frame, further simplifying an operation flow of image processing. In another example, the image acquired in operation S300 includes no selection region, but the entire image is selected by default or a to-be-segmented object is otherwise marked or pre-determined.

Second, the image and the selection region acquired in operation S300 are input into the deep-learning neural network for image segmentation, and the first segmentation result is modified according to the correction information input by the user with respect to the first segmentation result in user interaction.

The used deep-learning neural network is the foregoing trained neural network.

Figure 10A:
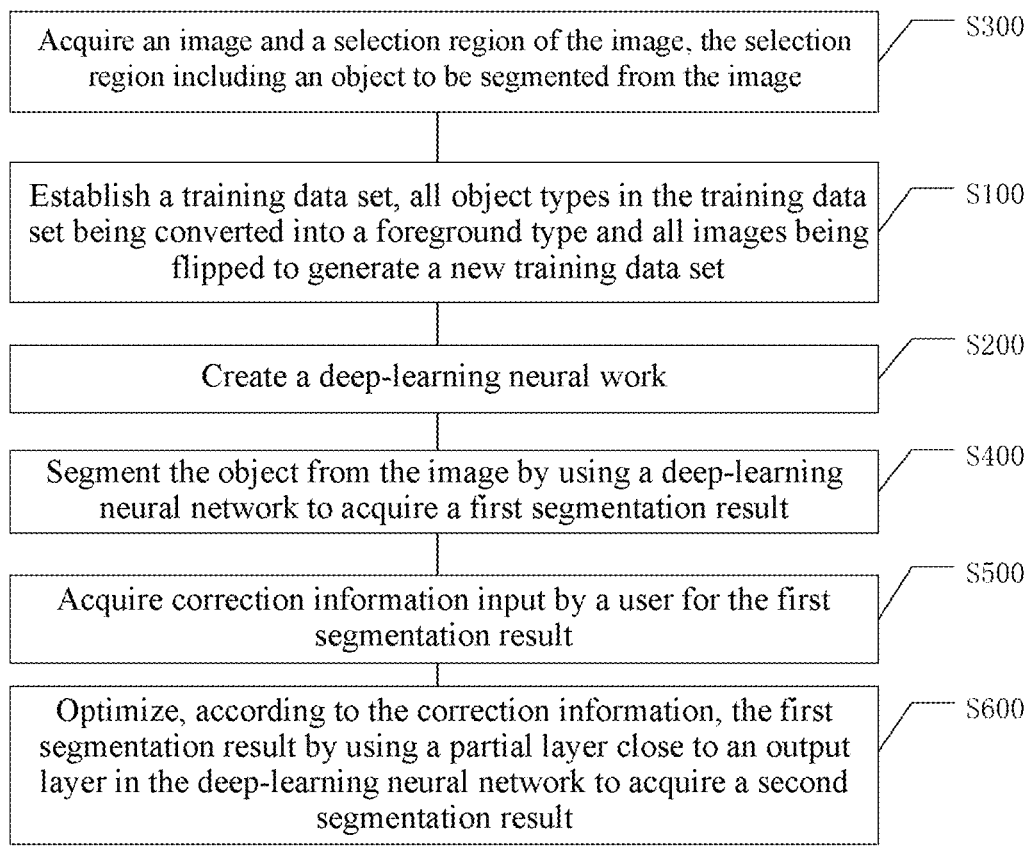
FIG. 10A is an example flowchart of an image processing method according to still another example embodiment of the disclosure.

Therefore, referring to FIG. 10A, the following operations are also included before operation S400:

S100: Establish a training data set, all object types in the training data set being converted into a foreground type and all images being flipped to generate a new training data set; and S200: Create a deep-learning neural work.

For details of training of the deep-learning neural network, the foregoing descriptions and the example embodiment of FIG. 5 may be referred to, and the details thereof are not described herein again.

Therefore, a structure of the deep-learning neural network has the following features: a basic network of the deep-learning neural network is an FCN, a branch of the RPN existing on a first convolutional layer of the FCN, the first convolutional layer being lower than a highest convolutional layer of the FCN and higher than a lowest convolutional layer of the FCN.

Figure 11:
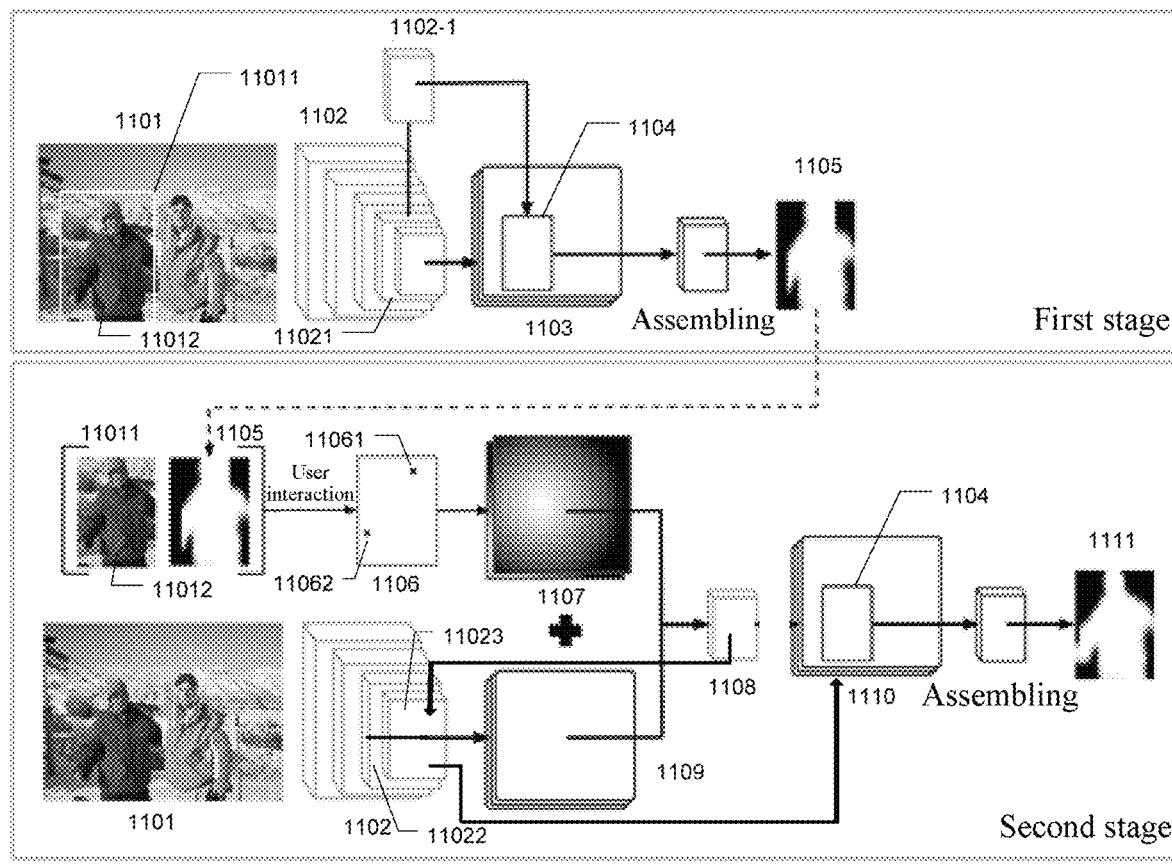
FIG. 11 is a schematic diagram of different stages of an image processing method according to an example embodiment of the disclosure.

Referring to FIG. 11, image segmentation by using a deep-learning neural network is mainly divided into two stages.

Stage 1 (operation S400):

After an image 1101 input by a user and an selection region 11011 are processed by a part of a convolutional layer before a first convolutional layer 11021 of an FCN 1102, an output image feature map 1103 (score map) continues to be processed by a convolutional layer higher than the first convolutional layer 11021, and the image feature map is also branched in an RPN 1102-1. A position-sensitive feature map 1103 outputted from a highest convolutional layer (referring to the example embodiment of the disclosure shown in FIG. 1, a highest convolutional layer is Conv_new) of the FCN 1102 is superimposed with a rectangular frame 1104 projected from the RPN 1102-1. After assembling training, an object 11012 in the rectangular frame 1104 outputted from the RPN 1102-1 is segmented to obtain a first segmentation result 1105 of the image 1101.

Figure 12A:
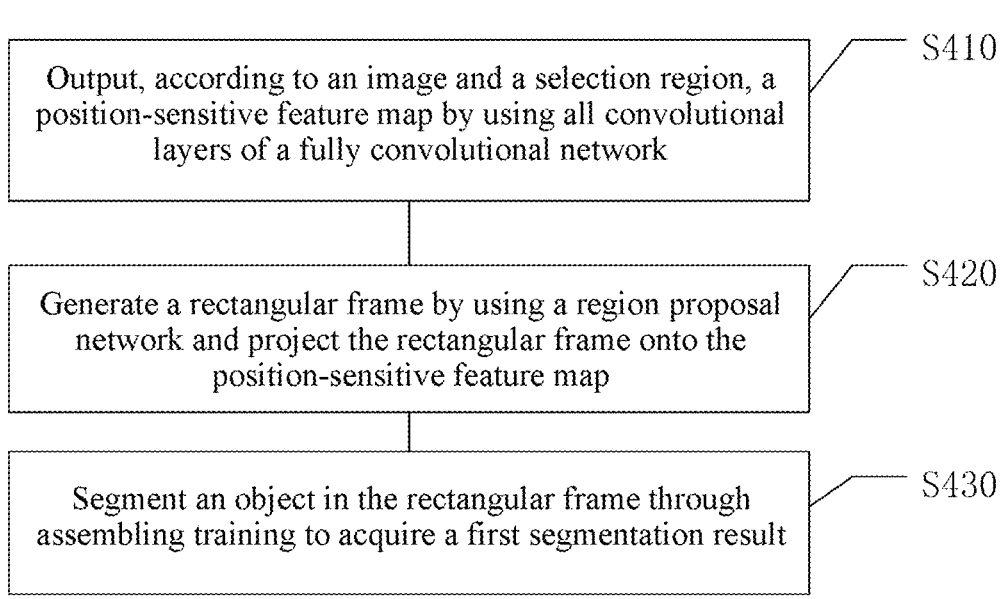
FIG. 12A is an example flowchart of a first stage in an image processing method according to an example embodiment of the disclosure.

Therefore, operation S400 includes the following operations shown in FIG. 12A:

S410: Output, according to an image and a selection region, a position-sensitive feature map by using all convolutional layers of a fully convolutional network;

S420: Generate a rectangular frame by using a region proposal network and project the rectangular frame onto the position-sensitive feature map; and S430: Segment an object in the rectangular frame through assembling training to acquire a first segmentation result.

The rectangular frame 1104 outputted from the RPN 1102-1 is different from the calibrated rectangular frame 11011 input by a user. The rectangular frame 1104 outputted from the RPN 1102-1 is used to calibrate a position range of the object 11012 in the image 1101. The rectangular frame 11011 input by the user indicates an image region in which the image object to be processed by the neural network is located, that is, the image object to be processed by the neural network is not the image 1101 input by the user, but a part of the image in the calibrated rectangular frame 11011 of the user.

Stage 2 (operation S600):

After the correction information input by the user with respect to the first segmentation result 1105 is acquired in operation S500, a position of a predicted error of the deep-learning neural network model in stage 1 is introduced in correction taps 11061 and 11062 of the user, and a corresponding correction distance map 1106 is generated. The correction distance map 1107 and a feature map 1109 outputted from a second convolutional layer 11022 are input, in parallel through an interaction module 1108, to a higher third convolutional layer 11023. A new position-sensitive feature map 1110 is outputted by using the third convolutional layer 11023 and a higher convolutional layer than the third convolutional layer 11023. The object 11012 in the rectangular frame 1104 is segmented again through assembling training to generate a new second segmentation result 1111. An operation is performed again herein by using the third convolutional layer to a partial convolutional layer (equivalent to a partial layer close to an output layer in a neural network) of a highest convolutional in FCN to generate the new second segmentation result 1111.

Figure 13A:
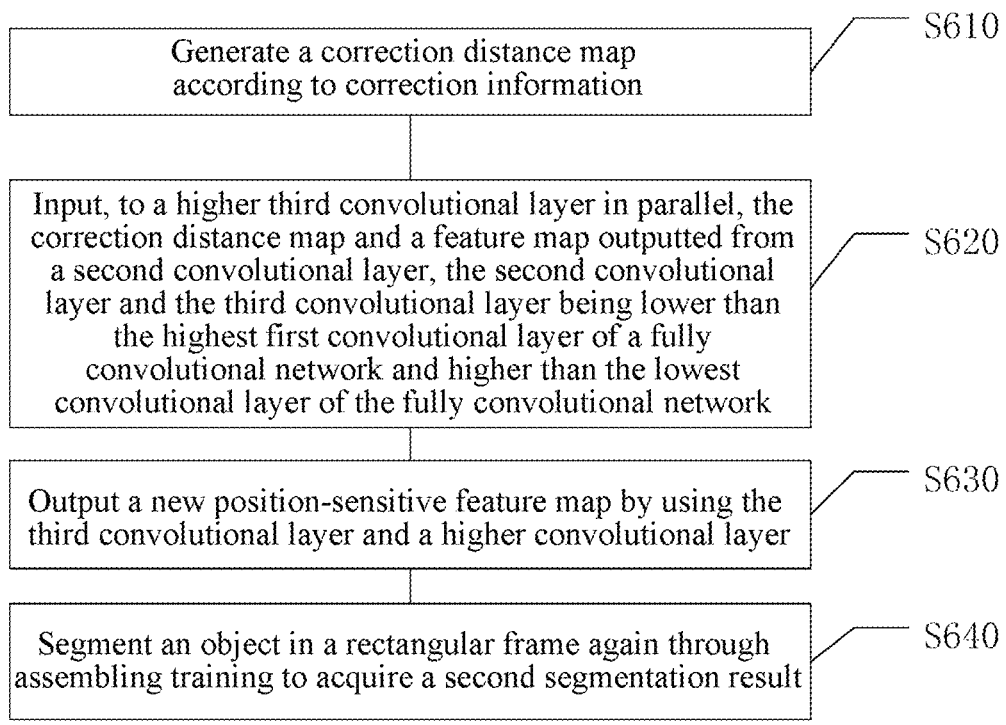
FIG. 13A is an example flowchart of a second stage in an image processing method according to an example embodiment of the disclosure.

Therefore, operation S600 includes the following operations shown in FIG. 13A:

S610: Generate a correction distance map according to correction information;

S620: Input, to a higher third convolutional layer in parallel, the correction distance map and a feature map outputted from a second convolutional layer, the second convolutional layer and the third convolutional layer being lower than a highest first convolutional layer of a fully convolutional network and higher than a lowest convolutional layer of the fully convolutional network;

S630: Output a new position-sensitive feature map by using the third convolutional layer and a higher convolutional layer than the third convolutional layer 11023; and S640: Segment an object in a rectangular frame again through assembling training to acquire a second segmentation result.

In some embodiments of the disclosure, the second convolutional layer 11022 is selected as a last module Conv4_23 of a convolutional layer Conv4 of the FCN 1102. An updated feature map is obtained after the feature map 1109 outputted by the module Conv4_23 and the correction distance map 1107 acquired from user interaction are connected in parallel through the interaction module 1108. The updated feature map is input into a convolutional layer Conv5 higher than the module Conv4_23, and a new position-sensitive feature map 1110 is output by using the convolutional layer Conv5 higher than the module Conv4_23 and the Conv_new. The third convolutional layer 11023 is a module Conv5_1. Both the second convolutional layer 11022 (the module Conv4_23) and the third convolutional layer 11023 are higher than a lowest convolutional layer of the FCN 1102 and lower than a highest convolutional layer of the FCN 1102.

Selection of the second convolutional layer 11022 and the third convolutional layer 11023 may be adjusted according to demands. For example, in the first stage, during the generation of the rectangular frame 1104 by using the RPN 1102-1, the object 11012 is no longer classified by using the new training set data converted into a single foreground type, causing an excessive calculation data amount to the neural network. Selection of positions of the second convolutional layer 11022 and the third convolutional layer 11023 may reduce an excessive calculation data burden. In addition, a single type of image segmentation and user correction are specially selected for the new training data set of the deep-learning neural network of the disclosure. Image recognition and correction optimization are provided for training during generation of the neural network. Modification of the segmentation result by using a partial convolutional layer has the following advantages: parameters of a convolutional layer lower than the second convolutional layer 11022 are fixed and modification and/or optimization is skipped therefor, and only a partial layer of the neural network, particularly a partial layer close to the output layer, is used for modification and/or optimization. Accordingly, a calculation burden of the entire network is reduced, efficiency of modification of the segmentation result by the neural network based on correction information may be improved effectively, an image segmentation speed is improved, and costs are reduced, causing the user to obtain better user experience.

Therefore, in a process of generation of the deep-learning neural network model, during training of the parameters of the network model, corresponding training may be performed according to the requirements of the two stages of the image processing method by using the neural network model. In the two stages, positions of the first convolutional layer to the third convolutional layer may also be selected according to setting during training of the network model.

Taps 11061 and 11062 by the user on an error region in the segmentation result is acquired by receiving correction information input by the user with respect to the first segmentation result 1105 in user interaction. Similar to a training process of the deep-learning neural network model, correction information of user interaction in a manner of correction tapping by the user indicates an error in the first segmentation result 1105 obtained by superimposing the position-sensitive feature map 1103 outputted from FCN 1102 in stage 1 and the rectangular frame 1104 outputted from the RPN 1102-1. Still referring to an upper part of FIG. 8, if the segmentation result 806 has a partial image 8061 more than the expected segmentation result, it indicates that the partial image 8061 belongs to the background type other than the segmented object 8011. Such background correction tapping 802 is processed to generate a background correction distance map 804. Referring to a lower part of FIG. 8, if the segmentation result 806 has a partial image 8062 less than the expected segmentation result, it indicates that the partial image belongs to the object 8011 in the foreground type other than the background type. Such foreground correction tapping 803 is processed to generate a foreground correction distance map 805. Both correction distance maps 804, 805 are superimposed with the feature map 1109 outputted from the second convolutional layer 11022 in the FCN to obtain, through training, an updated position-sensitive feature map 1110 from a higher convolutional layer.

Figure 9B:
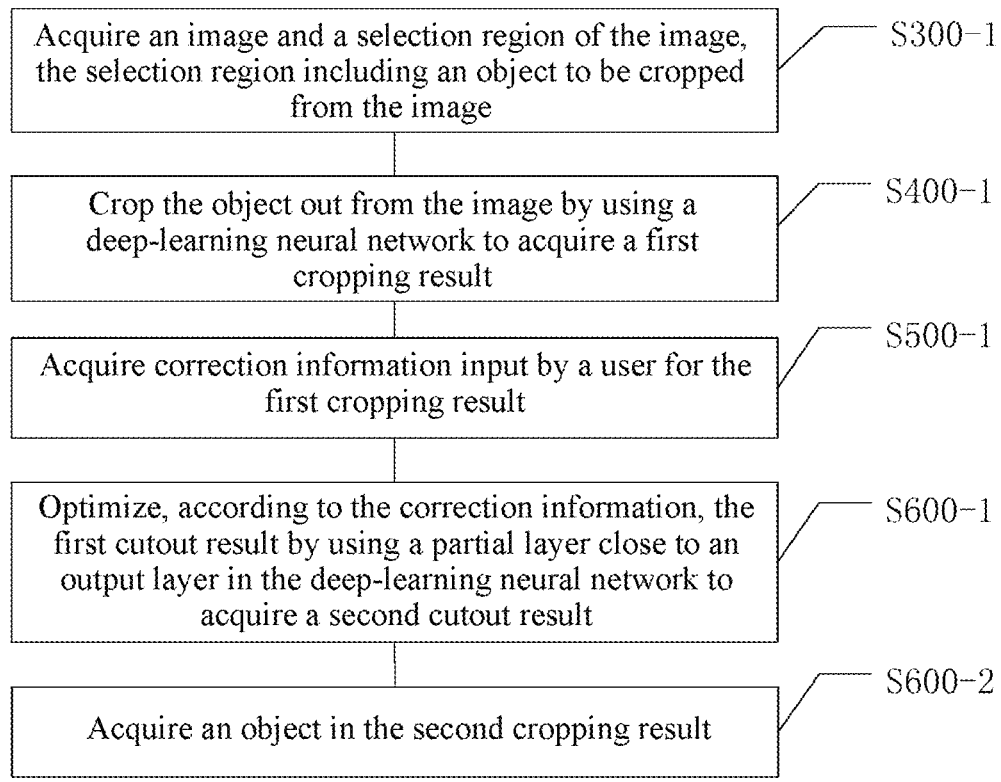
FIG. 9B is an example flowchart of an image processing method according to another example embodiment of the disclosure.

Now, referring to the example image processing method in FIG. 9B, a flow of image cropping by using a deep-learning neural network is introduced. Compared with the image processing methods described in FIG. 9A, FIG. 10A, FIG. 12A and FIG. 13A, in the method in an example embodiment of FIG. 9B, an object in an image is segmented and cropped in a same or similar manner, and after a second cropping result is obtained, the object is obtained from the second cropping result. The method includes the following operations:

S300-1: Acquire an image and a selection region of the image, the selection region including an object to be cropped from the image;

S400-1: Crop the object from the image by using a deep-learning neural network to acquire a first cropping result;

S500-1: Acquire correction information input by a user with respect to the first cropping result;

S600-1: Modify, according to the correction information, the first cropping result by using a partial layer close to an output layer in the deep-learning neural network to acquire a second cropping result; and S600-2: Acquire an object in the second cropping result.

Figure 10B:
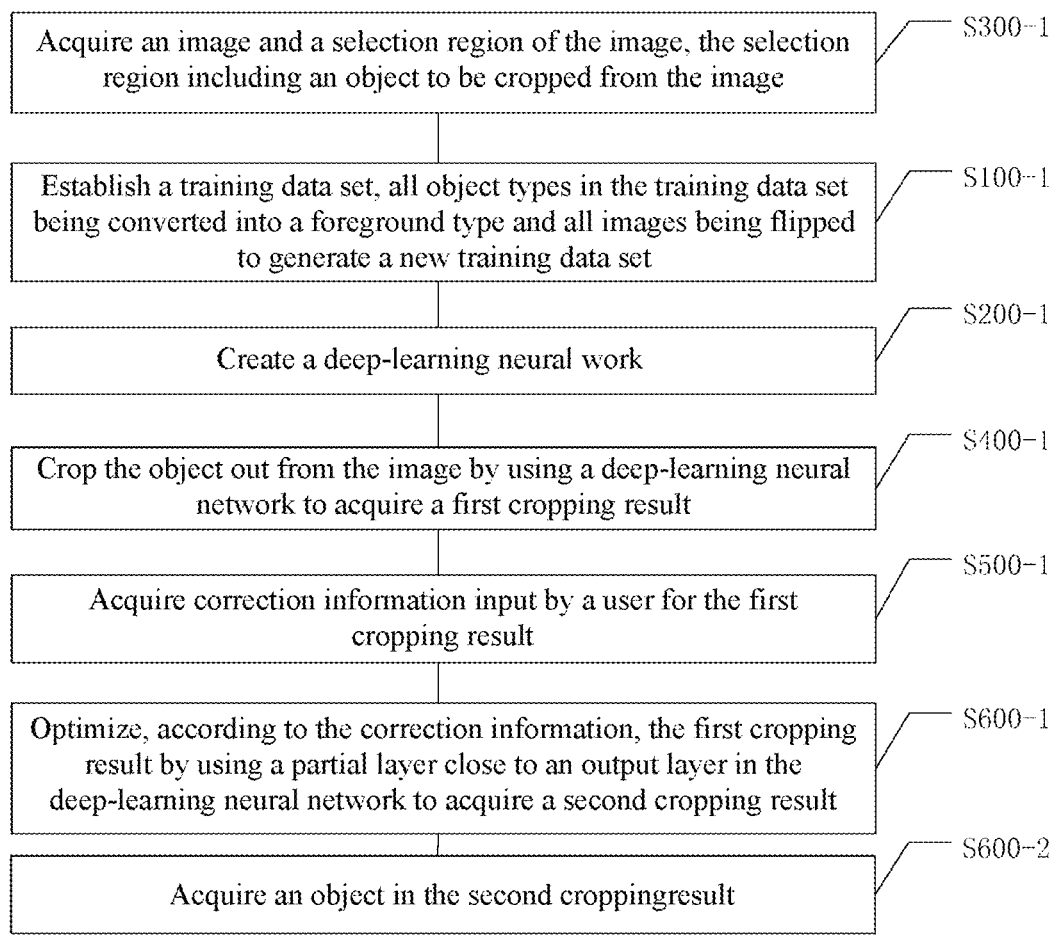
FIG. 10B is an example flowchart of an image processing method according to yet another example embodiment of the disclosure.

According to an example embodiment, referring to FIG. 10B, the following operations are further included before operation S400-1:

S100-1: Establish a training data set, all object types in the training data set being converted into a foreground type and all images being flipped to generate a new training data set; and S200-1: Create a deep-learning neural work.

Figure 12B:
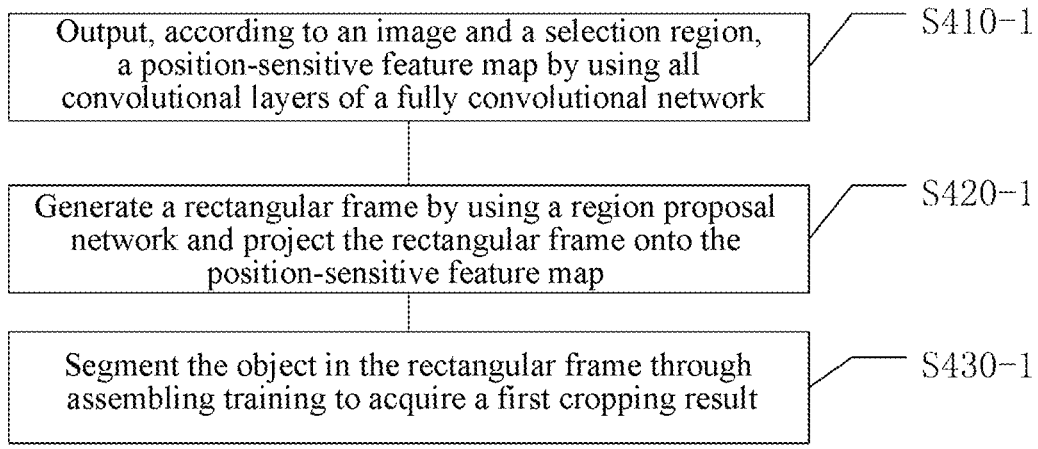
FIG. 12B is an example flowchart of a first stage in an image processing method according to another example embodiment of the disclosure.

According to an example embodiment, referring to FIG. 12B, operation S400-1 includes the following operations:

S410-1: Output, according to an image and a selection region, a position-sensitive feature map by using all convolutional layers of a fully convolutional network;

S420-1: Generate a rectangular frame by using a region proposal network and project the rectangular frame onto the position-sensitive feature map; and S430-1: Segment the object in the rectangular frame by assembling training to acquire a first cropping result.

Figure 13B:
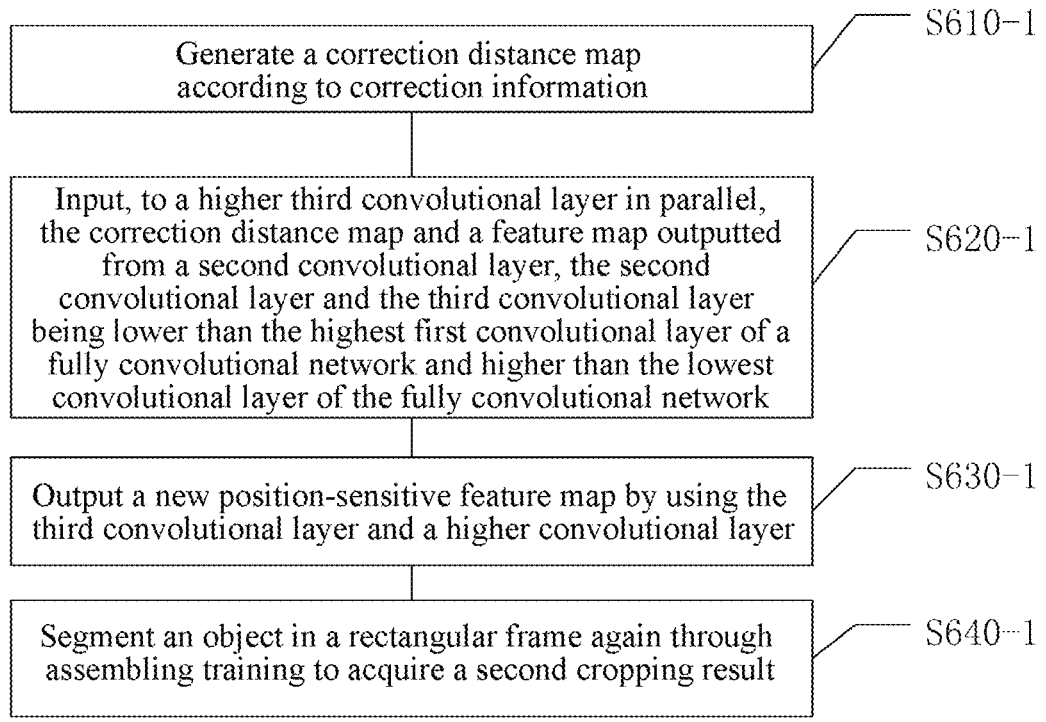
FIG. 13B is an example flowchart of a second stage in an image processing method according to another example embodiment of the disclosure.

Operation S600-1 includes the following operations shown in FIG. 13B:

S610-1: Generate a correction distance map according to correction information;

S620-1: Input, to a higher third convolutional layer in parallel, the correction distance map and a feature map outputted from a second convolutional layer, the second convolutional layer and the third convolutional layer being lower than a highest first convolutional layer of a fully convolutional network and higher than a lowest convolutional layer of the fully convolutional network;

S630-1: Output a new position-sensitive feature map by using the third convolutional layer and a higher convolutional layer; and S640-1: Segment the object in the rectangular frame again by assembling training to acquire the second cropping result.

A content similar to the image processing method for image segmentation is not described again in the image processing method for image cropping.

According to an example embodiment, the image processing method may be further loaded to a cloud platform for providing a service.

Figure 14A:
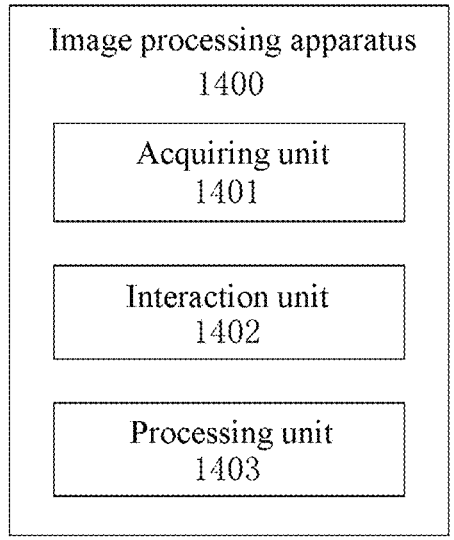
FIG. 14A is a schematic structural diagram of an image processing apparatus according to an example embodiment of the disclosure.

In addition, the disclosure further provides an image processing apparatus that performs image segmentation by using a deep-learning neural network. Referring to FIG. 14A, the image processing apparatus 1400 includes:

an acquiring unit 1401: configured to acquire an image and a selection region of the image from a user, the selection region including an object to be segmented from the image to acquire a first segmentation result;

an interaction unit 1402: configured to acquire correction information input by a user with respect to the first segmentation result; and a processing unit 1403: configured to segment the object from the image by using a deep-learning neural network, and modify, according to the correction information, the first segmentation result by using the deep-learning neural network (such as a partial layer close to an output layer in the deep-learning neural network) to acquire a second segmentation result.

The selection region of the image is generally a rectangular frame calibrated by the user on the image. The rectangular frame, as a selection region of interest to the user, includes the object to be segmented from the image. In addition, the rectangular frame used to calibrate the object may also be automatically generated through image recognition. The user may perform adjustment and determination by selecting or dragging an automatically provided recommended rectangular frame, further simplifying an operation flow of image processing. In another example, the image acquired in operation S300 includes no selection region, but the entire image is selected by default or a to-be-segmented object is otherwise marked or pre-determined.

A model structure of the deep-learning neural network is described with reference to the foregoing description. Therefore, a basic network of the deep-learning neural network is FCN. There is a branch of an RPN on a first convolutional layer of the FCN. The first convolutional layer is lower than a highest convolutional layer of the FCN and higher than a lowest convolutional layer of the FCN.

According to an example embodiment, the processing unit 1403 is further configured to:

output a position-sensitive feature map according to the image and the selection region by using all convolutional layers of the FCN, generate a rectangular frame by using the RPN and project the rectangular frame onto the position-sensitive feature map, and segment an object in the rectangular frame through assembling training to acquire a first segmentation result.

According to an example embodiment, the processing unit 1403 is further configured to:

generate a correction distance map according to correction information; input, to a higher third convolutional layer in parallel, the correction distance map and a feature map outputted from a second convolutional layer of an FCN, the second convolutional layer and the third convolutional layer being lower than a highest convolutional layer of the FCN and higher than a lowest convolutional layer of the FCN; output a new position-sensitive feature map by using the third convolutional layer and a higher convolutional layer; and segment the object in the rectangular frame again through assembling training to acquire a second segmentation result.

According to an example embodiment, correction information in user interaction may be correction tapping by a user on an error region. Therefore, the interaction unit 1402 is further configured to acquire tapping by the user on the error region in the first segmentation result.

Figure 14B:
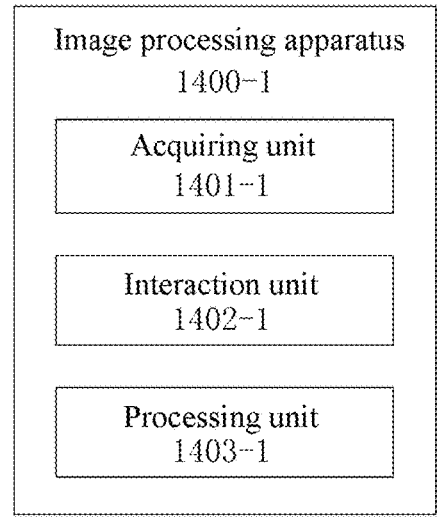
FIG. 14B is a schematic structural diagram of an image processing apparatus according to another example embodiment of the disclosure.

FIG. 14B shows an image processing apparatus according to another example embodiment. The image processing apparatus 1400-1 includes:

an acquiring unit 1401-1: configured to acquire an image and a selection region of the image from a user, the selection region including an object to be segmented from the image;

an interaction unit 1402-1: configured to acquire correction information input by a user with respect to a first cropping result; and a processing unit 1403-1: configured to crop the object from the image by using a deep-learning neural network, and modify, according to the correction information, the first cropping result by using a partial layer close to an output layer in the deep-learning neural network to acquire a second cropping result.

According to an example embodiment, the processing unit 1403-1 is further configured to:

output a position-sensitive feature map according to the image and the selection region by using all convolutional layers of the FCN, generate a rectangular frame by using the RPN and project the rectangular frame onto the position-sensitive feature map, and segment an object in the rectangular frame through assembling training to acquire a first cropping result.

According to an example embodiment, the processing unit 1403-1 is further configured to:

generate a correction distance map according to correction information; input, to a higher third convolutional layer in parallel, the correction distance map and a feature map outputted from a second convolutional layer of an FCN, the second convolutional layer and the third convolutional layer being lower than a highest convolutional layer of the FCN and higher than a lowest convolutional layer of the FCN; output a new position-sensitive feature map by using the third convolutional layer and a higher convolutional layer; and crop the object in the rectangular frame again by assembling training to acquire the second cropping result.

Although the fully convolutional network ResNet is used as the basic network of the deep-learning neural network in the disclosure, a person skilled in the art may implement the method of the disclosure by using other basic network structures that are different from ResNet. In addition, during user interaction, a similar effect may be further achieved by placing the correction distance map in different positions.

According to the example embodiments of the disclosure, in the image processing method and apparatus by using the deep-learning neural network, generation of the deep-learning neural network, and especially the method for generating the neural network model, the object of interest is calibrated by the rectangular frame, and the deep-learning neural network segments or crops the target object in the rectangular frame. Afterwards, the error region in the segmentation result or cropping result is selected through user interaction to correct the segmentation result or cropping result. The segmentation result or cropping result is modified and optimized by using the partial layer close to the output layer in the deep-learning neural network model again. During interactive segmentation, the segmentation result is modified only through a partial higher convolutional layer of the neural network, and the lower convolutional layer skips the operation, thereby greatly reducing the calculation burden. In such image processing method, the user only needs to calibrate the object of interest by using the rectangular frame to obtain a good segmentation result or cropping result, and more types of objects other than a few types of objects may be recognized. In addition, the image segmentation or cropping result of the neural network may be properly adjusted through user interaction to optimally perform image processing and obtain better user experience.

Although several modules or units of the image processing apparatus are mentioned in the foregoing detailed description, such division is not mandatory. In fact, according to the example embodiments of the disclosure, the features and functions of two or more modules or units described above may be embodied in one module or unit. Likewise, features and functions of one module or unit described above may be further embodied in a plurality of modules or units. The components displayed as modules or units may or may not be physical units, that is, may be located in one place, or may be distributed on a plurality of network units. Some or all of the modules may be selected according to practical requirements to achieve the objectives of the disclosure. A person of ordinary skill in the art may understand and implement the objective without creative efforts.

In an example embodiment of the disclosure, a computer-readable storage medium is further provided, storing a computer program. The program includes an executable instruction. When the executable instruction is executed by, for example, a processor, the operations of the image processing method described in any one of the foregoing embodiments may be implemented. In some possible implementations, various aspects of the disclosure may also be implemented in the form of a program product, which includes a program code. When the program product is run on a computing device, the program code is used to cause the computing device to perform the operations in the image processing method of this specification according to various example embodiments of the disclosure.

The program product for implementing the foregoing method according to the example embodiments of the disclosure may use a portable compact disk read-only memory (CD-ROM) and include a program code, and may be run on a terminal device, such as a personal computer. However, the program product of the disclosure is not limited thereto. In this file, the readable storage medium may be any tangible medium including or storing a program, and the program may be used by or in combination with an instruction execution system, apparatus, or device.

The program product may use any combination of one or more readable media. The readable medium may be a readable signal medium or a readable storage medium. The readable medium may be, for example, but not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a random access memory (RAM), a read only memory (ROM), an erasable programmable read only memory (EPROM) or flash memory, an optical fiber, a compact disk read only memory (CD-ROM), an optical storage device, a magnetic storage device, or any appropriate combination thereof.

The computer readable storage medium may include a data signal transmitted in a baseband or as part of a carrier, and stores readable program code. The propagated data signal may be in a plurality of forms, including, but not limited to, an electromagnetic signal, an optical signal, or any appropriate combination thereof. The readable storage medium may alternatively be any readable medium other than the readable storage medium. The readable medium may be configured to send, propagate, or transmit a program configured to be used by or in combination with an instruction execution system, apparatus, or device. The program code included in the readable storage medium may be transmitted by using any suitable medium, including but not limited to, via wireless transmission, wired transmission, a cable, radio frequency (RF) or the like, or any suitable combination of thereof.

The program code configured to execute the operations of the example embodiments of the disclosure may be written by using any combination of one or more programming languages. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. For the case involving a remote computing device, the remote computing device may be connected to a user computing device through any type of network including a local area network (LAN) or a wide area network (WAN), or may be connected to an external computing device (for example, through the Internet by using an Internet service provider).

In an example embodiment of the disclosure, an electronic device is further provided. The electronic device may include a processor, and a memory configured to store an executable instruction of the processor. The processor is configured to execute the operations of the image processing method in any one of the foregoing embodiments by executing the executable instruction.

Those skilled in the art may understand that various aspects of the disclosure may be embodied as a system, method, or program product. Therefore, various aspects of the disclosure may be specifically implemented in the following forms, that is, a hardware-only implementation, a software-only implementation (including firmware, microcode, and the like), or an implementation of a combination of hardware and software, which may be collectively referred to as a "circuit", "module", or "system" herein.

The electronic device 1500 according to this embodiment of the disclosure is described below with reference to FIG. 15. The electronic device 1500 shown in FIG. 15 is only an example, and does not impose any limitation on the functions and the scope of use of the example embodiments of the disclosure.

Figure 15:
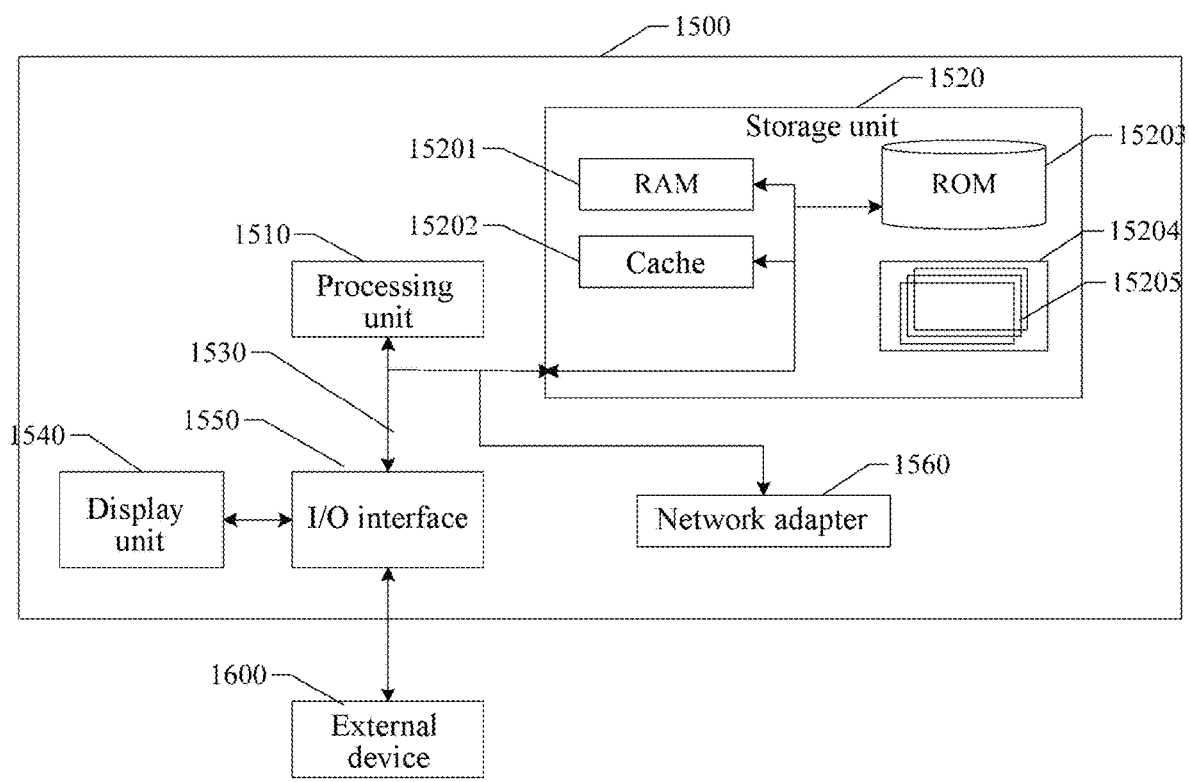
FIG. 15 is a structural block diagram of an electronic device for implementing an image processing method according to an example embodiment of the disclosure.

As shown in FIG. 15, the electronic device 1500 is represented in the form of a general-purpose computing device. Components of the electronic device 1500 may include, but are not limited to: at least one processing unit 1510, at least one storage unit 1520, a bus 1530 connecting different system components (including the storage unit 1520 and the processing unit 1510), a display unit 1540, and the like.

The storage unit stores a program code, and the program code may be executed by the processing unit 1510 to cause the processing unit 1510 to perform the operations in the image processing method of this specification according to various example embodiments of the disclosure. For example, the processing unit 1510 may perform the operations shown in FIG. 4, FIG. 5, FIG. 9, FIG. 10, FIG. 12, and FIG. 13.

The storage unit 1520 may include a readable medium in the form of a volatile storage unit, for example, a random access memory (RAM) 15201 and/or a cache storage unit 15202, and may further include a read-only memory (ROM) 15203.

The storage unit 1520 may further include a program/utility tool 15204 including a group of (at least one) program modules 15205, and such program modules 15205 include but are not limited to: an operating system, one or more application programs, other program modules, and program data. Each or certain combination of these examples may include implementation of a network environment.

The bus 1530 may be one or more of several types of bus structures, including a storage unit bus or a storage unit controller, a peripheral bus, a graphics acceleration port, a processing unit, or a local bus using any of various bus structures.

The electronic device 1500 may also communicate with one or more external devices 1600 (for example, a keyboard, a pointing device, a Bluetooth device, and the like), and may also communicate with one or more devices that enable a user to interact with the electronic device 1500, and/or communicate with any device (for example, a router, a modem, and the like) that enables the electronic device 1500 to communicate with one or more other computing devices. This communication may proceed through an input/output (I/O) interface 1550. Moreover, the electronic device 1500 may also communicate with one or more networks (for example, a local area network (LAN), a wide area network (WAN) and/or a public network such as the Internet) through a network adapter 1560. The network adapter 1560 may communicate with other modules of the electronic device 1500 through the bus 1530. It should be understood that although not shown in FIG. 7, other hardware and/or software modules may be used in conjunction with the electronic device 1500, including but not limited to: a microcode, a device driver, a redundancy processing unit, an external magnetic disk driving array, a redundant array of independent disks (RAID) system, a magnetic tape drive, and a data backup storage system, and the like.

Moreover, the electronic device 1500 may also communicate with one or more networks (such as a local area network (LAN), a wide area network (WAN), and/or a public network, such as the Internet) through the network adapter 1560. The network adapter 1560 may communicate with other modules of the electronic device 1500 through the bus 1530. It should be understood that although not shown in the figure, other hardware and/or software modules may be used in conjunction with the electronic device 1500, including but not limited to: microcode, device driver, redundant processing unit, external disk drive array, RAID system, tape drive and data backup storage system, and the like.

Therefore, the technical solutions according to the example embodiments of the disclosure may be embodied in the form of a software product. The software product may be stored in a non-volatile storage medium (which may be a CD-ROM, a USB flash drive, or the like) or on the network and includes several instructions for instructing a computing device (which may be a personal computer, a server, a network device, or the like) to perform the image processing method according to the example embodiments of the disclosure.

The disclosure has been described by using the foregoing related embodiments. However, the foregoing embodiments are only examples for implementing the disclosure. The disclosed embodiments do not limit the scope of the disclosure. On the contrary, changes and modifications made without departing from the spirit and scope of the disclosure shall fall within the protection scope of the disclosure.

What is claimed is:

1. An image processing method performed by a computing device deployed with a deep-learning neural network, the image processing method comprising:
   acquiring an image, the image comprising an object to be segmented from the image;
   segmenting the object from the image by using the deep-learning neural network to acquire a first segmentation result;
   acquiring correction information input by a user with respect to the first segmentation result; and
   modifying, based on correction information, the first segmentation result by using the deep-learning neural network, to acquire a second segmentation result,
   wherein a basic network of the deep-learning neural network is a fully convolutional network, and the segmenting the object comprises:
   outputting, according to the image, a position-sensitive feature map by using all convolutional layers of the fully convolutional network;
   generating a rectangular frame by using a region proposal network, which is at a lower layer than a highest convolutional layer of the fully convolutional network, and projecting the rectangular frame onto the position-sensitive feature map that is output from the highest convolutional layer; and
   performing assembling training on the position-sensitive feature map onto which the rectangular frame is superimposed, and segmenting the object in the rectangular frame through the assembling training to acquire the first segmentation result.

2. The image processing method according to claim 1, wherein the deep-learning neural network comprises a first part and a second part connected to each other, the second part being closer to an output side of the deep-learning neural network than the first part,
   the segmenting the object comprises segmenting the object from the image by using the first part and the second part of the deep-learning neural network to acquire the first segmentation result, and
   the modifying comprises modifying, based on the correction information, the first segmentation result by using the second part of the deep-learning neural network, to acquire the second segmentation result.

3. The image processing method according to claim 1, further comprising, prior to the segmenting the object:
   acquiring a training data set, and converting all object types in the training data set into a foreground type to generate a new training data set; and
   training the deep-learning neural network by using the new training data set.

4. The image processing method according to claim 1, wherein
   a branch of the region proposal network exists on a first convolutional layer of the fully convolutional network, the first convolutional layer being lower than the highest convolutional layer of the fully convolutional network and higher than a lowest convolutional layer of the fully convolutional network.

5. The image processing method according to claim 4, wherein the modifying the first segmentation result comprises:
   generating a correction distance map based on the correction information;
   inputting, to a third convolutional layer in parallel, the correction distance map and a feature map outputted from a second convolutional layer of the fully convolutional network, the third convolutional layer being higher than the second convolutional layer, and the second convolutional layer and the third convolutional layer being lower than the highest convolutional layer of the fully convolutional network and higher than the lowest convolutional layer of the fully convolutional network;
   outputting a new position-sensitive feature map by using the third convolutional layer and a convolutional layer higher than the third convolutional layer; and
   segmenting the object in the rectangular frame again through assembling training to acquire the second segmentation result.

6. The image processing method according to claim 1, wherein the acquiring the correction information comprises: acquiring tapping by the user on a region in the first segmentation result.

7. The image processing method according to claim 1, wherein the acquiring the image comprises:
   acquiring the image and a selection region of the image, the selection region comprising the object to be segmented from the image.

8. An image processing apparatus, comprising:
   at least one memory configured to store program code; and
   at least one processor configured to read the program code and operate as instructed by the program code, the program code comprising:
   acquiring code configured to cause at least one of the at least one processor to acquire an image, the image comprising an object to be segmented from the image;

interaction code configured to cause at least one of the at least one processor to acquire correction information input by a user with respect to a first segmentation result; and processing code configured to cause at least one of the at least one processor to segment the object from the image by using a deep-learning neural network to acquire the first segmentation result, and modify, based on the correction information, the first segmentation result by using the deep-learning neural network to acquire a second segmentation result, wherein a basic network of the deep-learning neural network is a fully convolutional network, and the processing code comprises:

outputting code configured to cause at least one of the at least one processor to output, according to the image, a position-sensitive feature map by using all convolutional layers of the fully convolutional network;

generating code configured to cause at least one of the at least one processor to generate a rectangular frame by using a region proposal network, which is at a lower layer than a highest convolutional layer of the fully convolutional network, and projecting the rectangular frame onto the position-sensitive feature map that is output from the highest convolutional layer; and performing code configured to cause at least one of the at least one processor to perform assembling training on the position-sensitive feature map onto which the rectangular frame is superimposed, and segmenting the object in the rectangular frame through the assembling training to acquire the first segmentation result.

9. The image processing apparatus according to claim 8, wherein a branch of the region proposal network exists on a first convolutional layer of the fully convolutional network, the first convolutional layer being lower than the highest convolutional layer of the fully convolutional network and higher than a lowest convolutional layer of the fully convolutional network.

10. The image processing apparatus according to claim 9, wherein the processing code further comprises:

code configured to cause at least one of the at least one processor to generate a correction distance map based on the correction information;

code configured to cause at least one of the at least one processor to input, to a third convolutional layer in parallel, the correction distance map and a feature map outputted from a second convolutional layer of the fully convolutional network, the third convolutional layer being higher than the second convolutional layer, and the second convolutional layer and the third convolutional layer being lower than the highest convolutional layer of the fully convolutional network and higher than the lowest convolutional layer of the fully convolutional network;

code configured to cause at least one of the at least one processor to output a new position-sensitive feature map by using the third convolutional layer and a convolutional layer higher than the third convolutional layer; and code configured to cause at least one of the at least one processor to segment the object in the rectangular frame again through assembling training to acquire the second segmentation result.

11. The image processing apparatus according to claim 8, wherein the interaction code further causes at least one of the at least one processor to acquire tapping by the user on a region in the first segmentation result.

12. The image processing apparatus according to claim 8, wherein the deep-learning neural network comprises a first part and a second part connected to each other, the second part being closer to an output side of the deep-learning neural network than the first part, the processing code further causes at least one of the at least one processor to segment the object from the image by using the first part and the second part of the deep-learning neural network to acquire the first segmentation result, and modify, based on the correction information, the first segmentation result by using the second part of the deep-learning neural network, to acquire the second segmentation result.

13. The image processing apparatus according to claim 8, wherein the program code further comprises:

code configured to cause at least one of the at least one processor to acquire a training data set, and convert all object types in the training data set into a foreground type to generate a new training data set; and code configured to cause at least one of the at least one processor to train the deep-learning neural network by using the new training data set.

14. The image processing apparatus according to claim 8, wherein the acquiring code further causes at least one of the at least one processor to acquire the image and a selection region of the image, the selection region comprising the object to be segmented from the image.

15. A non-transitory computer-readable storage medium storing a computer program, which, when executed by at least one processor, causes the at least one processor to perform:

acquiring an image and a cropping region of the image, the cropping region comprising an object to be cropped from the image;

cropping the object from the image by using a deep-learning neural network to acquire a first cropping result;

acquiring correction information input by a user with respect to the first cropping result;

modifying, based on the correction information, the first cropping result by using the deep-learning neural network to acquire a second cropping result; and acquiring the object in the second cropping result, wherein a basic network of the deep-learning neural network is a fully convolutional network, and the cropping the object comprises:

outputting, according to the image, a position-sensitive feature map by using all convolutional layers of the fully convolutional network;

generating a rectangular frame by using a region proposal network, which is at a lower layer than a highest convolutional layer of the fully convolutional network, and projecting the rectangular frame onto the position-sensitive feature map that is output from the highest convolutional layer; and performing assembling training on the position-sensitive feature map onto which the rectangular frame is superimposed, and cropping the object in the rectangular frame through the assembling training to acquire the first cropping result.

\* \* \* \* \*